(12) United States Patent
Wu et al.

(10) Patent No.: US 9,348,842 B2
(45) Date of Patent: May 24, 2016

(54) VIRTUALIZED DATA STORAGE SYSTEM OPTIMIZATIONS

(75) Inventors: David Tze-Si Wu, San Francisco, CA (US); Huy Nguyen, Cupertino, CA (US); Adityashankar Kini, San Carlos, CA (US); Dilip Kumar Uppugandla, Sunnyvale, CA (US); Chinmaya Manjunath, Sunnyvale, CA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 601 days.

(21) Appl. No.: 12/730,198

(22) Filed: Mar. 23, 2010

(65) Prior Publication Data
US 2010/0241654 A1    Sep. 23, 2010

Related U.S. Application Data

(60) Provisional application No. 61/162,463, filed on Mar. 23, 2009.

(51) Int. Cl.
*G06F 17/30* (2006.01)
*G06F 12/08* (2016.01)
*G06F 15/16* (2006.01)
*G06F 3/06* (2006.01)

(52) U.S. Cl.
CPC ...... *G06F 17/30233* (2013.01); *G06F 12/0862* (2013.01); *G06F 17/30132* (2013.01); *G06F 3/067* (2013.01); *G06F 3/0643* (2013.01); *G06F 3/0653* (2013.01); *G06F 2212/6024* (2013.01)

(58) Field of Classification Search
None
See application file for complete search history.

(56) References Cited

U.S. PATENT DOCUMENTS

| 7,441,012 B2 | 10/2008 | Palevich |
| 7,631,148 B2 | 12/2009 | Fair |
| 8,055,702 B2 * | 11/2011 | Lango et al. ............ 709/203 |
| 2003/0195940 A1 * | 10/2003 | Basu et al. ............... 709/213 |

(Continued)

FOREIGN PATENT DOCUMENTS

| WO | 2008138008 A1 | 11/2008 |
| WO | 2010111312 A2 | 9/2010 |

OTHER PUBLICATIONS

Sivathanu, Gopalan, "End-to-End Abstractions for Application-Aware Storage", The Graduate School Stony Brook University, May 2008, Stony Brook, NY.

(Continued)

*Primary Examiner* — Alex Gofman
(74) *Attorney, Agent, or Firm* — Park, Vaughan, Fleming & Dowler LLP; Laxman Sahasrabuddhe

(57) ABSTRACT

Virtual storage arrays consolidate branch data storage at data centers connected via wide area networks. Virtual storage arrays appear to storage clients as local data storage; however, virtual storage arrays actually store data at the data center. Virtual storage arrays overcome bandwidth and latency limitations of the wide area network by predicting and prefetching storage blocks, which are then cached at the branch location. Virtual storage arrays leverage an understanding of the semantics and structure of high-level data structures associated with storage blocks to predict which storage blocks are likely to be requested by a storage client. Virtual storage arrays may use proximity-based, heuristic-based, and access time-based prefetching to predict high-level data structure entities that are likely to be accessed by the storage client. Virtual storage arrays then identify and prefetch storage blocks corresponding with the predicted high-level data structure entities.

26 Claims, 10 Drawing Sheets

(56) References Cited

U.S. PATENT DOCUMENTS

2004/0019612 A1* 1/2004 Tyra et al. .................. 707/104.1
2008/0140937 A1 6/2008 Nalawade et al.

OTHER PUBLICATIONS

Michael Shapiro et al.: "Managing Databases With Binary Large Objects", Proceedings of the 16th IEEE Mass Storage System Symposium, Mar. 1999, San Diego, CA pp. 185-193.

James Griffioen et al.: "Reducing File System Latency Using a Predictive Approach", Proceedings of the Summer Usenix Conference, Jun. 6, 1994, pp. 1-10, XP002218796.

Nagapramod Mandagere et al.: "Greenstore: Application-Aided Energy-Efficient Storage", Mass Storage Systems and Technologies, 24th IEEE Conference, IEEE, Piscataway, NJ, Sep. 1, 2007, ISBN: 978-0-7695-3025-3, pp. 1-13.

* cited by examiner

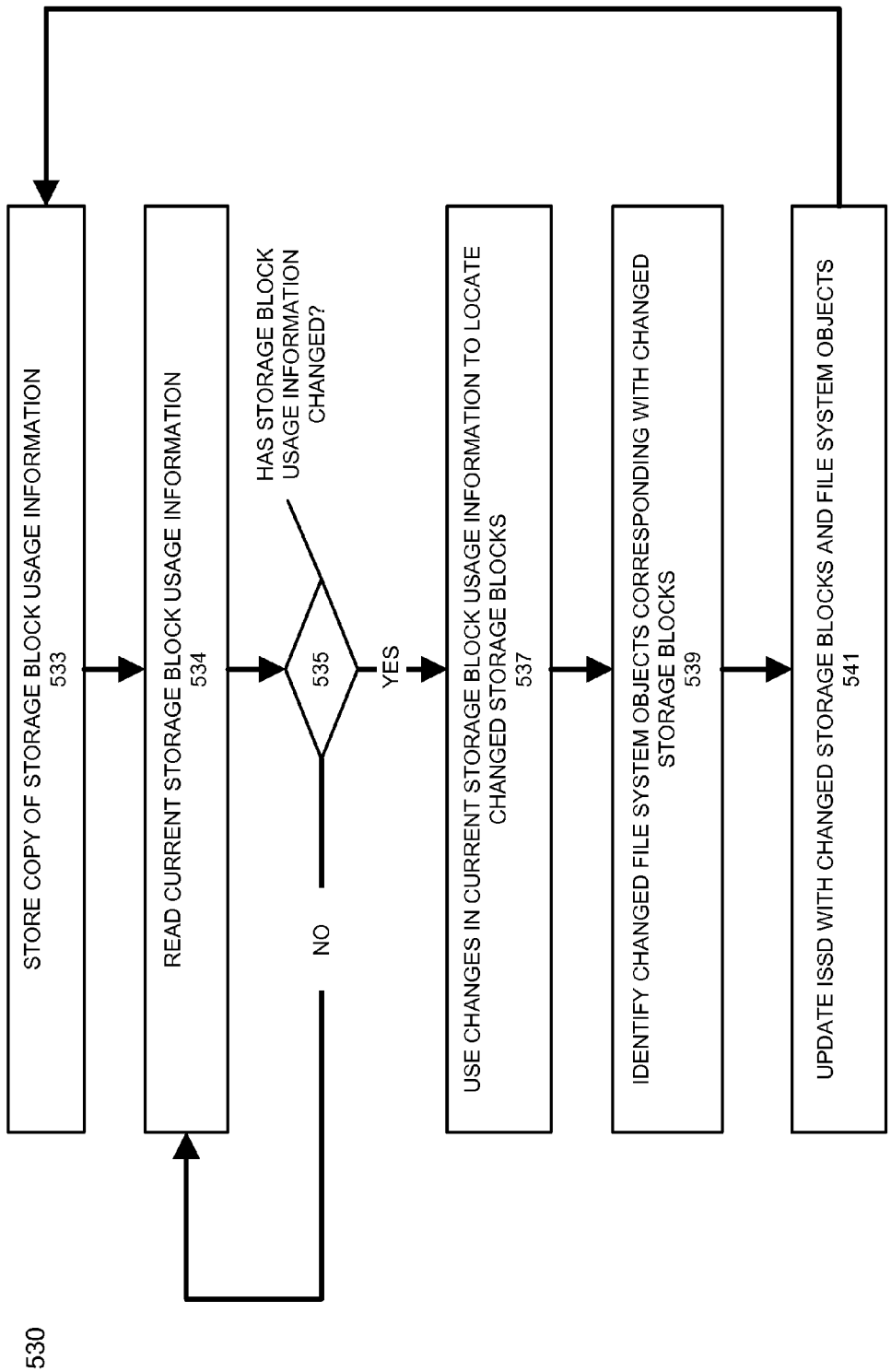

VIRTUALIZED DATA STORAGE SYSTEM OPTIMIZATIONS

CROSS-REFERENCE TO RELATED APPLICATIONS

This application is related to U.S. Provisional Patent Application No. 61/162,463, entitled "Virtualized Data Storage Over Wide-Area Networks", filed Mar. 23, 2009; U.S. patent application Ser. No. 12/730,179, entitled "Virtualized Data Storage Over Wide-Area Networks", filed Mar. 23, 2010; U.S. patent application Ser. No. 12/730,185, entitled "Virtualized Data Storage System Architecture"; and U.S. patent application Ser. No. 12/730,192, entitled "Virtualized Data Storage System Cache Management", filed Mar. 23, 2010; all of which are incorporated by reference herein for all purposes.

BACKGROUND

The present invention relates generally to data storage systems, and systems and methods to improve storage efficiency, compactness, performance, reliability, and compatibility. Enterprises often span geographical locations, including multiple corporate sites, branch offices, and data centers, all of which are generally connected over a wide-area network (WAN). Although in many cases, servers are run in a data center and accessed over the network, there are also cases in which servers need to be run in distributed locations at the "edges" of the network. These network edge locations are generally referred to as branch locations in this application, regardless of the purposes of these locations. The need to operate servers at branch locations may arise from variety of reasons, including efficiently handling large amounts of newly written data and ensuring service availability during WAN outages.

The need to run servers at branch locations in a network, as opposed to a centralized data center location, leads to a corresponding requirement for data storage for those servers at the branch locations, both to store the operating system data for branch servers, in some cases, for user or application data. The branch data storage requires maintenance and administration, including proper sizing for future growth, data snapshots, archives, and backups, and replacements and/or upgrades of storage hardware and software when the storage hardware or software fails or branch data storage requirements change.

Although the maintenance and administration of data storage in general incurs additional costs, branch data storage is more expensive and inefficient than consolidated data storage at a centralized data center. Organizations often require on-site personnel at each branch location to configure and upgrade each branch's data storage, and to manage data backups and data retention. Additionally, organizations often purchase excess storage capacity for each branch location to allow for upgrades and growing data storage requirements. Because branch locations are serviced infrequently, due to their numbers and geographic dispersion, organizations often deploy enough data storage at each branch location to allow for months or years of storage growth. However, this excess storage capacity often sits unused for months or years until it is needed, unnecessarily driving up costs.

Although the consolidation of information technology infrastructure decreases costs and improves management efficiency, branch data storage is rarely consolidated at a network branch location, because the intervening WAN is slow and has high latency, making storage accesses unacceptably slow for branch client systems and application servers. Thus, organizations have previously been unable to consolidate data storage from multiple branches.

BRIEF DESCRIPTION OF THE DRAWINGS

The invention will be described with reference to the drawings, in which:

FIGS. 5A-5C illustrate methods of updating an inferred storage structure database to improve virtualized data storage system performance according to an embodiment of the invention;

SUMMARY

Figure 1:
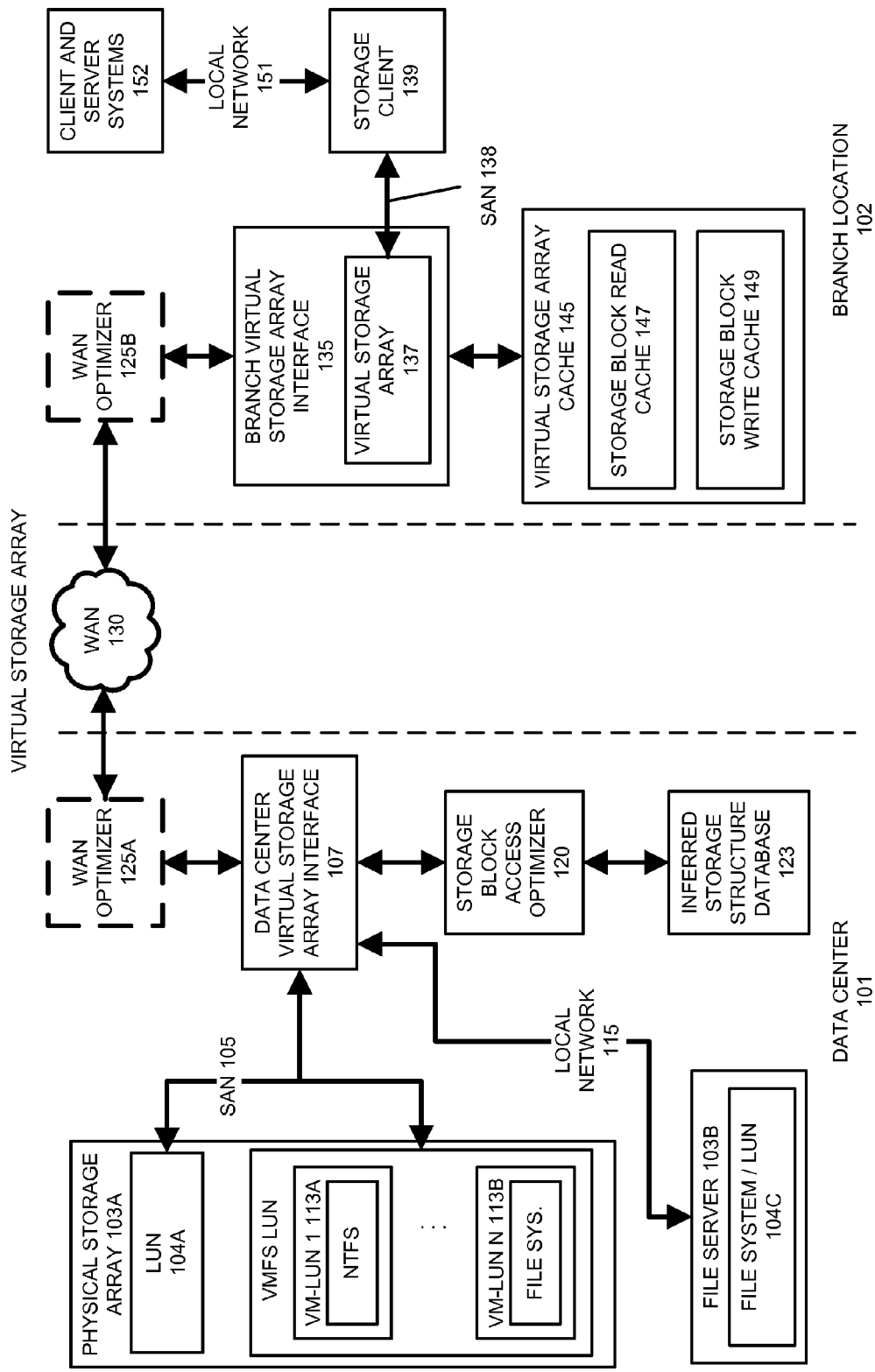
FIG. 1 illustrates a virtualized data storage system architecture according to an embodiment of the invention.

An embodiment of the invention uses virtual storage arrays to consolidate branch location-specific data storage at data centers connected with branch locations via wide area networks. The virtual storage array appears to a storage client as a local branch data storage; however, embodiments of the invention actually store the virtual storage array data at a data center connected with the branch location via a wide-area network. In embodiments of the invention, a branch storage client accesses the virtual storage array using storage block based protocols.

Embodiments of the invention overcome the bandwidth and latency limitations of the wide area network between branch locations and the data center by predicting storage blocks likely to be requested in the future by the branch storage client and prefetching and caching these predicted storage blocks at the branch location. When this prediction is successful, storage block requests from the branch storage client may be fulfilled in whole or in part from the branch location' storage block cache. As a result, the latency and bandwidth restrictions of the wide-area network are hidden from the storage client.

The branch location storage client uses storage block-based protocols to specify reads, writes, modifications, and/or deletions of storage blocks. However, servers and higher-level applications typically access data in terms of files in a structured file system, relational database, or other high-level data structure. Each entity in the high-level data structure, such as a file or directory, or database table, node, or row, may be spread out over multiple storage blocks at various non-contiguous locations in the storage device. Thus, prefetching storage blocks based solely on their locations in the storage device is unlikely to be effective in hiding wide-area network latency and bandwidth limits from storage clients.

An embodiment of the invention leverages an understanding of the semantics and structure of the high-level data structures associated with the storage blocks to predict which storage blocks are likely to be requested by a storage client in the near future. Embodiments of the invention may use reactive prefetching to identify one or more of the high-level data structure entities associated with a requested storage block and then prefetch storage blocks corresponding with additional portions of the same or other related high-level data structure entities. Embodiments of the invention may also use proactive prefetching to analyze a selected high-level data structure entity and identify portions of the same or other high-level data structure entities that are likely to be accessed by the storage client and then prefetch additional storage blocks corresponding with these high-level data structure entities.

Embodiments of the invention may use proximity-based prefetching, heuristic-based prefetching, and access time-based prefetching alone or in combination to identify portions of high-level data structure entities for prefetching. Proximity-based prefetching selects portions of high-level data structure entities close to other portions of these high-level data structure entities that are being accessed or are likely to be accessed. Storage blocks corresponding with the selected portions of high-level data structure entities are then prefetched. Although the portions of the high-level data structure entity are in proximity to each other within an high-level data structure entity, their corresponding storage blocks may not be in proximity to each other.

Heuristic-based prefetching applies one or more heuristics to identify additional portions of one or more high-level data structure entities for prefetching. For example, applications employing a specific type of file may frequently access data at a specific location within these files, such as at the beginning or end of the file. Using knowledge of this application or entity-specific behavior, an embodiment may identify these frequently accessed portions of the file for prefetching. In a further example of heuristic-based prefetching, an embodiment analyzes the high-level data structure entities to identify related portions of the same or other high-level data structure entity for prefetching, such as a reference to an overlay files, static or dynamically loaded libraries, driver files, object linking and embedding files, control panel files, system level files, configuration files, related database tables, or data files. This example of heuristic-based prefetching then prefetches storage blocks corresponding with these referenced high-level data structure entities. In another example of heuristic-based prefetching, an embodiment analyzes application or operating system log files or other data structures to identify the sequence of files or other high-level data structure entities accessed during operations such an operating system or application start-up. Storage blocks corresponding with this sequence of files or other high-level data structure entities may be selected for prefetching.

Access time-based prefetching monitor the times at which high-level data structure entities are accessed. High-level data structure entities that are accessed at approximately the same time are associated together by the virtual storage array architecture. When one of these high-level data structure entities is accessed in response to a storage request or selected for proactive prefetching, an embodiment will prefetch storage blocks corresponding with other high-level data structure entities having similar prior access times.

DETAILED DESCRIPTION OF ILLUSTRATIVE EMBODIMENTS

FIG. 1 illustrates a virtualized data storage system architecture 100 according to an embodiment of the invention. Virtualized data storage system architecture 100 includes a data center 101 connected with at least one branch network location 102 via a wide-area network (WAN) 130. Each branch location 102 includes at least one storage client 139, such as a file server, application server, database server, or storage area network (SAN) interface. A storage client 139 may be connected with a local-area network (LAN) 151, including routers, switches, and other wired or wireless network devices, for connecting with server and client systems and other devices 152.

Previously, typical branch location installations also required a local physical data storage device for the storage client. For example, a prior typical branch location LAN installation may include a file server for storing data for the client systems and application servers, such as database servers and e-mail servers. In prior systems, this branch location's data storage is located at the branch location site and connected directly with the branch location LAN or SAN. The branch location physical data storage device previously could not be located at the data center 101, because the intervening WAN 130 is too slow and has high latency, making storage accesses unacceptably slow for storage clients.

An embodiment of the invention allows for storage consolidation of branch location-specific data storage at data centers connected with branch locations via wide area networks. This embodiment of the invention overcomes the bandwidth and latency limitations of the wide area network between branch locations and the data center. To this end, an embodiment of the invention includes virtual storage arrays.

In an embodiment, the branch location 102 includes a virtual storage array interface device 135. The virtual storage array interface device 135 presents a virtual storage array 137 to branch location users, such as the branch location storage client 139. A virtual storage array 137 can be used for the same purposes as a local storage area network or other data storage device. For example, a virtual storage array 137 may be used in conjunction with a file server for general-purpose data storage, in conjunction with a database server for database application storage, or in conjunction with an e-mail server for e-mail storage. However, the virtual storage array 137 stores its data at a data center 101 connected with the branch location 102 via a wide area network 130. Multiple separate virtual storage arrays, from different branch locations, may store their data in the same data center and, as described below, on the same physical storage devices.

Because the data storage of multiple branch locations is consolidated at a data center, the efficiency, reliability, cost-effectiveness, and performance of data storage is improved. An organization can manage and control access to their data storage at a central data center, rather than at large numbers of separate branch locations. This increases the reliability and performance of an organization's data storage. This also reduces the personnel required at branch location offices to provision, maintain, and backup data storage. It also enables organizations to implement more effective backup systems, data snapshots, and disaster recovery for their data storage. Furthermore, organizations can plan for storage growth more efficiently, by consolidating their storage expansion for multiple branch locations and reducing the amount of excess unused storage. Additionally, an organization can apply optimizations such as compression or data deduplication over the data from multiple branch locations stored at the data center, reducing the total amount of storage required by the organization.

In an embodiment, virtual storage array interface 135 may be a stand-alone computer system or network appliance or built into other computer systems or network equipment as hardware and/or software. In a further embodiment, a branch location virtual storage array interface 135 may be implemented as a software application or other executable code running on a client system or application server.

In an embodiment, a branch location virtual storage array interface 135 includes one or more storage array network interfaces and supports one or more storage block network protocols to connect with one or more storage clients 139 via a local storage area network (SAN) 138. Examples of storage array network interfaces suitable for use with embodiments of the invention include Ethernet, Fibre Channel, IP, and InfiniBand interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP. In cases where the storage array network interface uses Ethernet, an embodiment of the branch location virtual storage array interface can use the branch location LAN's physical connections and networking equipment for communicating with client systems and application services. In other embodiments, separate connections and networking equipment, such as Fibre Channel networking equipment, is used to connect the branch location virtual storage array interface with client systems and/or application services.

It should be noted that the branch location virtual storage array interface 135 allows storage clients to access data in the virtual storage array via storage block protocols, unlike file servers that utilize file-based protocols. Thus, the virtual storage array 137 may be accessed by any type of storage client in the same manner as a local physical storage device or storage array. Furthermore, applications executed by the storage client 139 or other client and server systems 152 may access the virtual storage array in the same manner as a local physical storage device or storage array.

In an embodiment, the storage client 139 is included in a file server that also provide a network file interface to the virtual storage array 137 to client systems and other application servers. In a further embodiment, the branch location virtual storage array interface 135 is integrated as hardware and/or software with an application server, such as a file server, database server, or e-mail server. In this embodiment, the branch location virtual storage array interface 135 can include application server interfaces, such as a network file interface, for interfacing with other application servers and/or client systems.

A branch location virtual storage array interface 135 presents a virtual storage array 137 to one or more storage clients 139. To the storage client 139, the virtual storage array 137 appears to be a local storage array, having its physical data storage at the branch location 102. However, the branch location virtual storage array interface 135 actually stores and retrieves data from physical data storage devices located at the data center 101. Because virtual storage array data accesses must travel via the WAN 130 between the data center 101 LAN to a branch location 102 LAN, the virtual storage array 137 is subject to the latency and bandwidth restrictions of the WAN 130.

In an embodiment, the branch location virtual storage array interface 135 includes a virtual storage array cache 145, which is used to ameliorate the effects of the WAN 130 on virtual storage array 137 performance. In an embodiment, the virtual storage array cache 145 includes a storage block read cache 147 and a storage block write cache 149.

The storage block read cache 147 is adapted to store local copies of storage blocks requested by storage client 139. As described in detail below, the virtualized data storage system architecture 100 may attempt to predict which storage blocks will be requested by the storage client 139 in the future and preemptively send these predicted storage blocks from the data center 101 to the branch 102 via WAN 130 for storage in the storage block read cache 147. If this prediction is partially or wholly correct, then when the storage client 139 eventually requests one or more of these prefetched storage blocks from the virtual storage array 137, an embodiment of the virtual storage array interface 135 can fulfill this request using local copies of the requested storage blocks from the block read cache 145. By fulfilling access requests using prefetched local copies of storage blocks from the block read cache 145, the latency and bandwidth restrictions of WAN 130 are hidden from the storage client 139. Thus, from the perspective of the storage client 139, the virtual storage array 137 appears to perform storage block read operations as if the physical data storage were located at the branch location 102.

Similarly, the storage block write cache 149 is adapted to store local copies of new or updated storage blocks written by the storage client 139. As described in detail below, the storage block write cache 149 temporarily stores new or updated storage blocks written by the storage client 139 until these storage blocks are copied back to physical data storage at the data center 101 via WAN 130. By temporarily storing new and updated storage blocks locally at the branch location 102, the bandwidth and latency of the WAN 130 is hidden from the storage client 139. Thus, from the perspective of the storage client 139, the virtual storage array 137 appears to perform storage block write operations as if the physical data storage were located at the branch location 102.

In an embodiment, the virtual storage array cache 145 includes non-volatile and/or redundant data storage, so that data in new or updated storage blocks are protected from system failures until they can be transferred over the WAN 130 and stored in physical data storage at the data center 101.

In an embodiment, the branch location virtual storage array interface 135 operates in conjunction with a data center virtual storage array interface 107. The data center virtual storage array interface 107 is located on the data center 101 LAN and may communicate with one or more branch location virtual storage array interfaces via the data center 101 LAN, the WAN 130, and their respective branch location LANs. Data communications between virtual storage array interfaces can be in any form and/or protocol used for carrying data over wired and wireless data communications networks, including TCP/IP.

In an embodiment, data center virtual storage array interface 107 is connected with one or more physical data storage devices 103 to store and retrieve data for one or more virtual storage arrays, such as virtual storage array 137. To this end, an embodiment of a data center virtual storage array interface 107 accesses a physical storage array network interface, which in turn accesses physical data storage array 103a on a storage array network (SAN) 105. In another embodiment, the data center virtual storage array interface 107 includes one or more storage array network interfaces and supports one or more storage array network protocols for directly connecting with a physical storage array network 105 and its physical data storage array 103a. Examples of storage array network interfaces suitable for use with embodiments of the invention include Ethernet, Fibre Channel, IP, and InfiniBand interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP. Embodiments of the data center virtual storage array interface 107 may connect with the physical storage array interface and/or directly with the physical storage array network 105 using the Ethernet network of the data center LAN and/or separate data communications connections, such as a Fibre Channel network.

In another embodiment, data center virtual storage array interface 107 may store and retrieve data for one or more virtual storage arrays, such as virtual storage array 137, using a network storage device, such as file server 103b. File server 103b may be connected with data center virtual storage array 137 via local-area network (LAN) 115, such as an Ethernet network, and communicate using a network file system protocol, such as NFS, SMB, or CIFS.

Embodiments of the data center virtual storage array interface 107 may utilize a number of different arrangements to store and retrieve virtual storage array data with physical data storage array 103a or file server 103b. In one embodiment, the virtual data storage array 137 presents a virtualized logical storage unit, such as an iSCSI or FibreChannel logical unit number (LUN), to storage client 139. This virtual logical storage unit is mapped to a corresponding logical storage unit 104a on physical data storage array 103a. Data center virtual storage array interface 107 stores and retrieves data for this virtualized logical storage unit using a non-virtual logical storage unit 104a provided by physical data storage array 103a. In a further embodiment, the data center virtual data storage array interface 107 supports multiple branch locations and maps each storage client's virtualized logical storage unit to a different non-virtual logical storage unit provided by physical data storage array 103a.

In another embodiment, virtual data storage array interface 107 maps a virtualized logical storage unit to a virtual machine file system 104b, which is provided by the physical data storage array 103a. Virtual machine file system 104b is adapted to store one or more virtual machine disk images 113, each representing the configuration and optionally state and data of a virtual machine. Each of the virtual machine disk images 113, such as virtual machine disk images 113a and 113b, includes one or more virtual machine file systems to store applications and data of a virtual machine. To a virtual machine application, its virtual machine disk image 113 within the virtual machine file system 104b appears as a logical storage unit. However, the complete virtual machine file system 104b appears to the data center virtual storage array interface 107 as a single logical storage unit.

In another embodiment, virtual data storage array interface 107 maps a virtualized logical storage unit to a logical storage unit or file system 104c provided by the file server 103c.

As described above, storage clients can interact with virtual storage arrays in the same manner that they would interact with physical storage arrays. This includes issuing storage commands to the branch location virtual storage interface using storage array network protocols such as iSCSI or Fibre Channel protocol. Most storage array network protocols organize data according to storage blocks, each of which has a unique storage address or location. A storage block's unique storage address may include logical unit number (using the SCSI protocol) or other representation of a logical volume.

In an embodiment, the virtual storage array provided by a branch location virtual storage interface allows a storage client to access storage blocks by their unique storage address within the virtual storage array. However, because one or more virtual storage arrays actually store their data within one or more of the physical data storage devices 103, an embodiment of the invention allows arbitrary mappings between the unique storage addresses of storage blocks in the virtual storage array and the corresponding unique storage addresses in one or more physical data storage devices 103. In an embodiment, the mapping between virtual and physical storage address may be performed by a branch location virtual storage array interface 137 and/or by data center virtual storage array interface 107. Furthermore, there may be multiple levels of mapping between the addresses of storage blocks in the virtual storage array and their corresponding addresses in the physical storage device.

In an embodiment, storage blocks in the virtual storage array may be of a different size and/or structure than the corresponding storage blocks in a physical storage array or data storage device. For example, if data compression is applied to the storage data, then the physical storage array data blocks may be smaller than the storage blocks of the virtual storage array to take advantage of data storage savings. In an embodiment, the branch location and/or data center virtual storage array interfaces map one or more virtual storage array storage blocks to one or more physical storage array storage blocks. Thus, a virtual storage array storage block can correspond with a fraction of a physical storage array storage block, a single physical storage array storage block, or multiple physical storage array storage blocks, as required by the configuration of the virtual and physical storage arrays.

In a further embodiment, the branch location and data center virtual storage array interfaces may reorder or regroup storage operations from storage clients to improve efficiency of data optimizations such as data compression. For example, if two storage clients are simultaneously accessing the same virtual storage array, then these storage operations will be intermixed when received by the branch location virtual storage array interface. An embodiment of the branch location and/or data center virtual storage array interface can reorder or regroup these storage operations according to storage client, type of storage operation, data or application type, or any other attribute or criteria to improve virtual storage array performance and efficiency. For example, a virtual storage array interface can group storage operations by storage client and apply data compression to each storage client's operations separately, which is likely to provide greater data compression than compressing all storage operations together.

As described above, an embodiment of the virtualized data storage system architecture 100 attempts to predict which storage blocks will be requested by a storage client in the near future, prefetches these storage blocks from the physical data storage devices 103, and forwards these to the branch location 102 for storage in the storage block read cache 147. When this prediction is successful and storage block requests may be fulfilled in whole or in part from the block read cache 147, the latency and bandwidth restrictions of the WAN 130 are hidden from the storage client. An embodiment of the virtualized data storage system architecture 100 includes a storage block access optimizer 120 to select storage blocks for prefetching to storage clients. In an embodiment, the storage block access optimizer 120 is located at the data center 101 and is connected or incorporated into the data center virtual data storage array interface 107. In an alternate embodiment, the storage block access optimizer 120 may be located at the branch location 102 and be connected with or incorporated into the branch location virtual data storage interface 135.

As discussed above, storage devices such as physical data storage arrays and the virtual data storage array are accessed using storage block-based protocols. A storage block is a sequence of bytes or bits of data. Data storage devices represent their data storage as a set of storage blocks that may be used to store and retrieve data. The set of storage blocks is an abstraction of the underlying hardware of a physical or virtual data storage device. Storage clients use storage block-based protocols to specify reads, writes, modifications, and/or deletions of storage blocks. However, servers and higher-level applications typically access data in terms of files in a structured file system, relational database, or other high-level data structure. Each entity in the high-level data structure, such as a file or directory, or database table, node, or row, may be spread out over multiple storage blocks at various non-contiguous locations in the storage device. Thus, prefetching storage blocks based solely on their location in the storage device is unlikely to be effective in hiding WAN latency and bandwidth limits from storage clients.

In an embodiment, the storage block access optimizer 120 leverages an understanding of the semantics and structure of the high-level data structures associated with the storage blocks to predict which storage blocks are likely to be requested by a storage client in the near future. To do this, the storage block access optimizer 120 must be able to determine the association between storage blocks and its high-level data structure. An embodiment of the storage block access optimizer 120 uses an inferred storage structure database (ISSD) 123 to match storage blocks with their associated entity in the high-level data structure. For example, given a specific storage block location, the storage block access optimizer 120 may use the ISSD 123 to identify the file or directory in a file system, or the database table, record, or node, that is using this storage block to store some or all of its data.

Once the storage block access optimizer 120 has identified the high-level data structure entity associated with a storage block, the storage block access optimizer 120 may employ a number of different techniques to predict which additional storage blocks are likely to be requested by a storage client. For example, storage block access optimizer 120 may observe requests from a storage client 139 for storage blocks from the virtual data storage array 137, identify the high-level data structure entities associated with the requested storage blocks, and select additional storage blocks associated with these or other high-level data structure entities for prefetching. These types of storage block prefetching techniques are referred to as reactive prefetching. In another example, the storage block access optimizer 120 may analyze entities in the high-level data structures, such as files, directories, or database entities, to identify specific entities or portions thereof that are likely to be requested by the storage client 139. Using the ISSD 123, the storage block access optimizer 120 identifies storage blocks corresponding with these identified entities or portions thereof and prefetches these storage blocks for storage in the block read cache 147 at the branch location 102. These types of storage block prefetching techniques are referred to as proactive prefetching. Further examples of reactive and proactive prefetching are discussed below. Embodiments of the storage block access optimizer 120 may utilize any combination of reactive and proactive prefetching techniques to select storage blocks to be prefetched and stored in the block read cache 147 at the branch location 102.

In a further embodiment, the branch location 102 and data center location 101 may optionally include network optimizers 125 for improving the performance of data communications over the WAN between branches and/or the data center. Network optimizers 125 can improve actual and perceived WAN network performance using techniques including compressing data communications; anticipating and prefetching data; caching frequently accessed data; shaping and restricting network traffic; and optimizing usage of network protocols. In an embodiment, network optimizers 125 may be used in conjunction with virtual data storage array interfaces 107 and 135 to further improve virtual storage array 137 performance for storage blocks accessed via the WAN 130. In other embodiments, network optimizers 125 may ignore or passthrough virtual storage array 137 data traffic, relying on the virtual storage array interfaces 107 and 135 at the data center 101 and branch location 102 to optimize WAN performance.

Further embodiments of the invention may be used in different network architectures. For example, a data center virtual storage array interface 107 may be connected directly between WAN 130 and a physical data storage array 103, eliminating the need for a data center LAN. Similarly, a branch location virtual storage array interface 135, implemented for example in the form of a software application executed by a storage client computer system, may be connected directly with WAN 130, such as the internet, eliminating the need for a branch location LAN. In another example, the data center and branch location virtual data storage array interfaces 107 and 135 may be combined into a single unit, which may be located at the branch location 102.

Figure 2A:
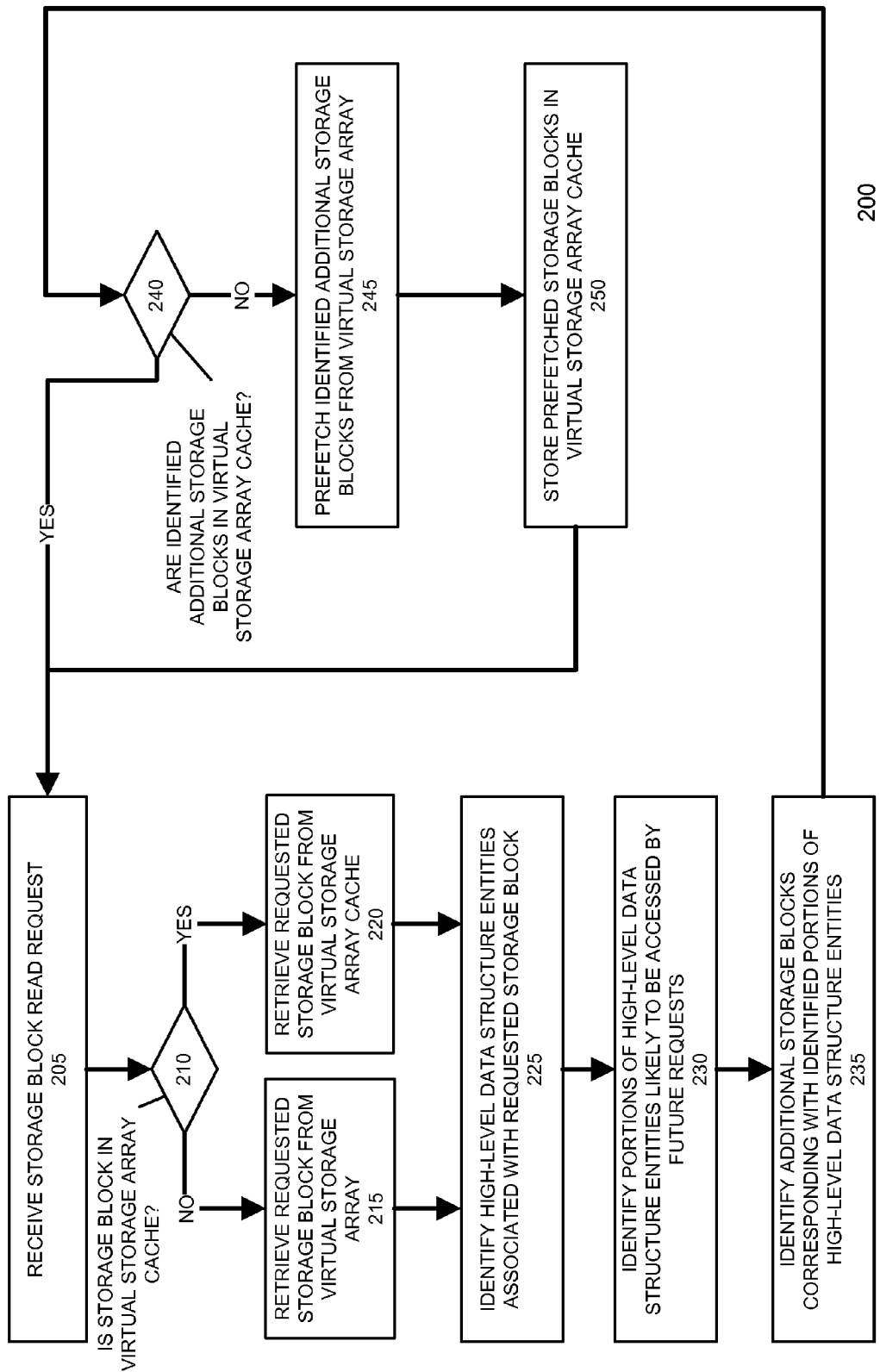
FIGS. 2A-2B illustrate methods of prefetching storage blocks to improve virtualized data storage system performance according to embodiments of the invention.
Figure 2B:
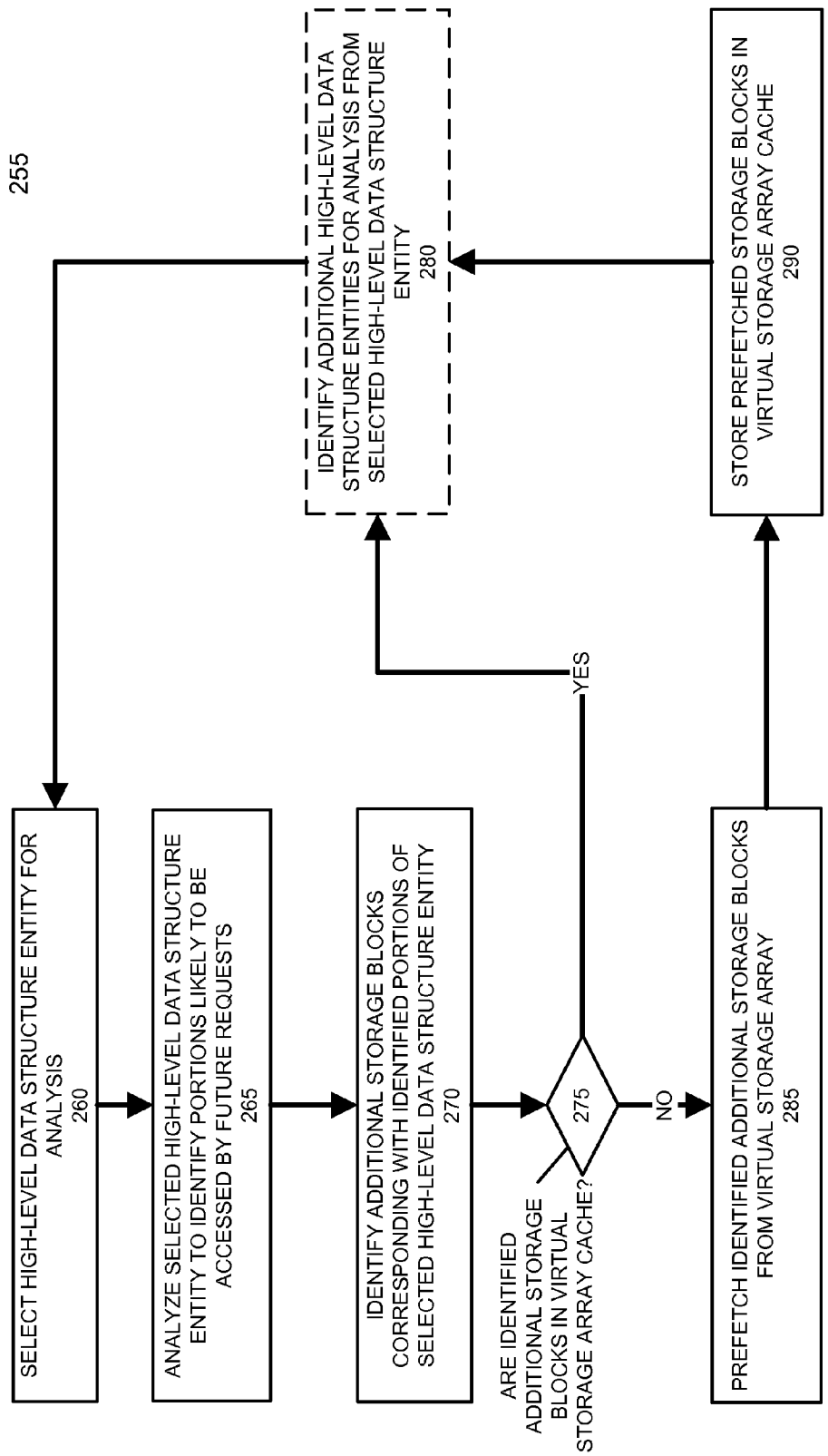

FIGS. 2A-2B illustrate methods of prefetching storage blocks to improve virtualized data storage system performance according to embodiments of the invention. FIG. 2A illustrates a method 200 of performing reactive prefetching of storage blocks according to an embodiment of the invention. Step 205 receives a storage block read request from a storage client at the branch location. In an embodiment, the storage block read request may be received by a branch location virtual data storage array interface.

In response to the receipt of the storage block read request in step 205, decision block 210 determines if the requested storage block has been previously retrieved and stored in the storage block read cache at the branch location. If so, step 220 retrieves the requested storage block from the storage block read cache and returns it to the requesting storage client. In an embodiment, if the system includes a data center virtual storage array interface, then step 220 also forwards the storage block read request back to the data center virtual storage array interface for use in identifying additional storage blocks likely to be requested by the storage client in the future.

If the storage block read cache at the branch location does not include the requested storage block, step 215 retrieves the requested storage block via a WAN connection from the virtual storage array data located in a physical data storage at the data center. In an embodiment, a branch location virtual storage array interface forwards the storage block read request to the data center virtual storage array interface via the WAN connection. The data center virtual storage array interface then retrieves the requested storage block from the physical storage array and returns it to the branch location virtual storage array interface, which in turn provides this requested storage block to the storage client. In a further embodiment of step 215, a copy of the retrieved storage block may be stored in the storage block read cache for future accesses.

During and/or following the retrieval of the requested storage block from the virtual storage array or virtual storage array cache, steps 225 to 250 prefetch additional storage blocks likely to be requested by the storage client in the near future. Step 225 identifies the high-level data structure entity associated with the requested storage block. Typical block storage protocols, such as iSCSI and FCP, specify block read requests using a storage block address or identifier. However, these storage block read requests do not include any identification of the high-level data structure, such as a file, directory, or database entity, that is associated with this storage block. Therefore, an embodiment of step 225 accesses an ISSD to identify the high-level data structure associated with the requested storage block.

In an embodiment, step 225 provides the ISSD with the storage block address or identifier. In response, the ISSD returns an identifier of the high-level data structure entity associated with the requested storage block. The identifier of the high-level data structure entity may be an inode or similar file system identifier or a database storage structure identifier, such as a database table or B-tree node. In a further embodiment, the ISSD also includes a location within the high-level data structure entity corresponding with the requested storage block. For example, step 225 may provide a storage block identifier to the ISSD and in response receive the inode or other file system identifier for a file stored in this storage block. Additionally, the ISSD can return an offset, index, or other file location indicator that specifies the portion of this file stored in the storage block.

Using the identification of the high-level data structure entity and optionally the location provided by the ISSD, step 230 identifies additional high-level data structure entities or portions thereof that are likely to be requested by the storage client. There are a number of different techniques for identifying additional high-level data structure entities or portions thereof for prefetching that may be used by embodiments of step 230. These techniques include including proximity-based prefetching, heuristic-based prefetching, and access time-based prefetching, and are described in detail below. Embodiments of step 230 may include the use of any number or combination of these prefetching techniques to identify one or more additional high-level data structure entities or portions thereof for prefetching.

Regardless of the type or combination of prefetching techniques used by step 230, step 230 identifies all or portions of one or more high-level data structure entities for prefetching based on the high-level data structure entity associated with the requested storage block. However, as discussed above, storage clients specify data access requests in terms of storage blocks, not high-level data structure entities such as files, directories, or database tables. Thus, step 235 identifies one or more storage blocks corresponding with the high-level data structure entities identified for prefetching in step 230. In an embodiment, step 235 provides the ISSD with identifiers for one or more high-level data structure entities, such as the inodes of files or similar identifiers for other types of file systems or database storage structures. Optionally, step 235 also provides an offset, file location, or other type of address identify a specific portion of a high-level data structure entity to be prefetched. In response, the ISSD returns an identifier of one or more storage blocks associated with the high-level data structure entities. These identified storage blocks are used to store the high-level data structure entities or portions thereof.

Decision block 240 determines if the storage blocks identified in step 235 have already been stored in the storage block read cache located at the branch location. In an embodiment, the storage block access optimizer at the data center maintains a record of all of the storage blocks that have copies stored in the storage block read cache. In an alternate embodiment, the storage block access optimizer queries the branch location virtual storage array interface to determine if copies of these identified storage blocks have already been stored in the storage block read cache.

In still a further embodiment, decision block 240 and the determination of whether an additional storage block has been previously retrieved and cached may be omitted. Instead, this embodiment can send all of the additional storage blocks identified by step 235 to the branch location virtual storage array interface to be cached. This embodiment can be used when WAN latency, rather than WAN bandwidth limitations, are an overriding concern.

If all of the identified storage blocks from step 235 are already stored in the storage block read cache, then method 200 proceeds from decision block 240 back to step 205 to await receipt of further storage block requests.

If some or all of the storage blocks identified in step 235 are not already stored in the storage block read cache, then step 245 retrieves these uncached storage blocks from the virtual storage array data located in a physical data storage on the data center LAN. The retrieved storage blocks are sent via the WAN connection from the data center location to the branch location. In an embodiment of step 245, the data center virtual storage array interface receives a request for the uncached identified storage blocks from the storage block access optimizer and, in response, accesses the physical data storage array to retrieve these storage blocks. The data center virtual storage array interface then forwards these storage blocks to the branch location virtual storage array interface via the WAN connection.

Step 250 stores the storage blocks identified for prefetching in the storage block read cache. In an embodiment of step 250, the branch location virtual storage array interface receives one or more storage blocks from the data center virtual storage array interface via the WAN connection and stores these storage blocks in the storage block read cache. Following step 250, method 200 proceeds to step 205 to await receipt of further storage block requests. The storage blocks added to the storage block read cache in previous iterations of method 200 may be available for fulfilling storage block read requests.

Method 200 may be performed by a branch virtual data storage array interface, by a data center virtual data storage array interface, or by both virtual data storage array interfaces working in concert. For example, steps 205 to 220 of method 200 may be performed by a branch location virtual storage array interface and steps 225 to 250 of method 200 may be performed by a data center virtual storage array interface. In another example, all of the steps of method 200 may be performed by a branch location virtual storage array interface. In yet a further example, all of the steps of method 200 may be performed by a data center virtual storage array interface. In this example, a branch location virtual storage array interface or storage block cache at the branch location may count and/or identify cache hits, which are storage requests from the storage client for storage blocks already prefetched and stored in the storage block cache. The branch location virtual storage array interface or storage block cache then provides feedback, such as the count and/or ratio of cache hits, the identity of the cached storage blocks hit, to the data center virtual storage array interface. This feedback is used by the data center virtual storage array interface to increase or decrease the amount and/or type of storage block prefetching used for further storage blocks.

FIG. 2B illustrates a method 255 of performing proactive prefetching of storage blocks according to an embodiment of the invention. Step 260 selects a high-level data structure entity for analysis. Examples of a selected high-level data structure entities include a file, directory, and other file system entity such as an inode, as well as database entities such as tables, records, and B-tree nodes or other structures.

Step 265 analyzes the selected high-level data structure entity to identify additional portions of the same high-level data structure entity or all or portions of additional high-level data structure entities that are likely to be requested by the storage client. There are a number of different techniques for identifying additional high-level data structure entities or portions thereof for prefetching that may be used by embodiments of step 265. These techniques include including proximity-based prefetching, heuristic-based prefetching, and access time-based prefetching, and are described in detail below. Embodiments of step 265 may include the use of any number or combination of these prefetching techniques to identify one or more additional high-level data structure entities or portions thereof for prefetching.

Regardless of the type or combination of prefetching techniques used by step 265, step 265 identifies all or portions of one or more high-level data structure entities for prefetching based on the high-level data structure entity associated with the requested storage block. However, as discussed above, storage clients specify data access requests in terms of storage blocks, not high-level data structure entities such as files, directories, or database tables. Therefore, step 270 identifies one or more storage blocks corresponding with the high-level data structure entities identified by step 265. In an embodiment, step 270 provides the ISSD with identifiers for one or more high-level data structure entities, such as the inodes of files or similar identifiers for other types of file systems or database storage structures. Optionally, step 270 also provides an offset, file location, or other type of address identify a specific portion of a high-level data structure entity to be prefetched. In response, the ISSD returns an identifier of one or more storage blocks associated with the high-level data structure entities. These storage blocks are used to store the high-level data structure entities or portions thereof.

Decision block 275 determines if the storage blocks identified in step 270 have already been stored in the storage block read cache located at the branch location. In an embodiment, the storage block access optimizer at the data center maintains a record of all of the storage blocks that have copies stored in the storage block read cache. In an alternate embodiment, the storage block access optimizer queries the branch location virtual storage array interface to determine if copies of these identified storage blocks have already been stored in the storage block read cache.

In still a further embodiment, decision block 275 and the determination of whether an additional storage block has been previously retrieved and cached may be omitted. Instead, this embodiment can send all of the additional storage blocks identified by step 270 to the branch location virtual storage array interface to be cached. This embodiment can be used when WAN latency, rather than WAN bandwidth limitations, are an overriding concern.

If all of the identified storage blocks from step 270 are already stored in the storage block read cache, then method 255 proceeds from decision block 275 to step 280. Optional step 280 determines if there are additional high-level data structure entities that should be included in the analysis of method 255, based on the results of step 265. For example, if steps 260 and 265 analyze a first file and identify a second file that should be prefetched, step 285 may include this second file in a list of high-level data structure entities to be analyzed by method 255, potentially identifying additional files from the analysis of this second file.

If some or all of the storage blocks identified in step 270 are not already stored in the storage block read cache, then step 285 retrieves these uncached storage blocks from the virtual storage array data located in a physical data storage on the data center LAN. The retrieved storage blocks are sent via the WAN connection from the data center location to the branch location. In an embodiment of step 280, the data center virtual storage array interface receives a request for the uncached identified storage blocks from the storage block access optimizer and accesses the physical data storage array to retrieve these storage blocks. The data center virtual storage array interface then forwards these storage blocks to the branch location virtual storage array interface via the WAN connection.

Step 290 stores the storage blocks identified for prefetching in the storage block read cache. In an embodiment of step 290, the branch location virtual storage array interface receives one or more storage blocks from the data center virtual storage array interface via the WAN connection and stores these storage blocks in the storage block read cache. Following step 290, method 255 proceeds to step 285. The storage blocks added to the storage block read cache in previous iterations of method 255 may be available for fulfilling storage block read requests.

Following step 280 or, if step 280 is omitted, decision block 275 or step 290, an embodiment of method 255 proceeds to step 260 to select another high-level data structure entity for analysis.

In an embodiment, steps 285 and 290 may be performed asynchronously or in parallel with further iterations of method 255. For example, a storage block access optimizer may direct the data center virtual storage array interface to retrieve one or more storage blocks. While this operation is being performed, the storage block access optimizer may continue with the execution of method 255 by proceeding to optional step 280 to identify further high-level data structure entities for analysis, and/or returning to step 260 for an additional iteration of method 255. When the data center virtual storage array interface has completed its retrieval of one or more storage blocks as requested, step 290 may be performed in the background and in parallel to transfer these storage blocks via the WAN to the branch location for storage in the storage block read cache.

Method 255 may be performed by a branch virtual data storage array interface, by a data center virtual data storage array interface, or by both virtual data storage array interfaces working in concert. For example, steps 260 to 285 of method 255 may be performed by a data center virtual storage array interface. In another example, all of the steps of method 255 may be performed by a branch location virtual storage array interface. Embodiments of method 255 may be performed as a preprocessing phase prior to receiving storage block requests from storage clients and/or in parallel with the processing of storage requests from storage clients.

As described above, steps 230 and 265 of methods 200 and 255, respectively, identify one or more additional high-level data structure entities to be prefetched by the storage architecture and cached by the branch virtual storage interface. These steps may use any combination of prefetching techniques, including proximity-based prefetching, heuristic-based prefetching, and access time-based prefetching.

Embodiments of methods 200 and 255 prefetch portions of the high-level data structure entity based on their adjacency or close proximity to the identified portion of the high-level data structure entity. This technique is referred to as proximity-based prefetching. For example, if step 225 of method 200 or step 265 of method 255 determines that the requested storage block corresponds with a portion of a file from file offset 0 up to offset 4095, then method 200 or 255 may select a second portion of this same file beginning with offset 4096 for prefetching. The storage blocks corresponding with the second portion of this file or other high-level data structure entity are then identified and prefetched by method 200 or 255. It should be noted that although these two portions are adjacent in the high-level data structure entity, their corresponding storage blocks may be non-contiguous. Thus, without the ability to identify a high-level data structure entity from a given storage block, as provided for by the ISSD or other data structures in embodiments of the virtual array architecture, this type of optimization cannot be performed.

Embodiments of methods 200 and 255 may also use heuristic-based prefetching to identify the type of high-level data structure entity, such as a file of a specific format, a directory in a file system, or a database table, and apply one or more heuristics to identify additional portions of this high-level data structure entity or a related high-level data structure entity for prefetching. For example, applications employing a specific type of file may frequently access data at a specific location within these files, such as at the beginning or end of the file. Using knowledge of this application or entity-specific behavior, methods 200 and 255 may identify these frequently accessed portions of the file for prefetching.

In a further example of heuristic-based prefetching, embodiments of methods 200 and/or 255 analyze the high-level data structure entity associated with the requested storage block to identify related portions of the same or other high-level data structure entity for prefetching. For example, application files may include references to additional files, such as overlay files, static or dynamically loaded libraries, driver files, object linking and embedding files, control panel files, system level files, configuration files, or data files. Similarly, a database table may include references to other database tables. Once the high-level data structure entity associated with a requested storage block has been identified, method 200 and/or 255 may use an analysis of this high-level data structure entity to identify and prefetch additional referenced high-level data structure entities.

In still another example of heuristic-based prefetching methods 200 and/or 255 may analyze application, virtual machine, or operating system specific files or other high-level data structure entities to identify additional high-level data structure entities for prefetching. For example, embodiments of the virtual storage array architecture may analyze application or operating system log files or other data structures to identify the sequence of files accessed during operations such an operating system or application start-up. One example of another data structure that may be analyzed to identify sequences of file accesses is the cache files of applications or operating system modules. For example, the Microsoft Windows operating system includes a prefetcher utility that specifies the sequences of files accessed during booting and application startup.

In yet another example of heuristic-based prefetching, the storage blocks corresponding with the master file table or other file system metadata data structure may be selected for prefetching when a storage client mounts the associated volume in the virtual storage array.

Because log files and other data structures, such as prefetcher utilities, do not identify storage blocks for prefetching, an embodiment of the invention may first analyze the log files, cache files, or other data structures to identify sequences of related files. These identified files may then be selected for prefetching, either prior to a storage request (proactive prefetching) or in response to a storage request (reactive prefetching). This embodiment of the invention then uses the ISSD to identify storage blocks corresponding with the files selected for prefetching.

In an example of proactive prefetching, an embodiment of the virtual storage array may select files for prefetching based on their sequence in an operating system boot log. The storage blocks corresponding with these files may then be prefetched and cached in a storage block cache prior to any storage requests from the storage client, so that these storage blocks can be accessed quickly when a storage client boots an operating system. In an example of reactive prefetching, an embodiment of the virtual storage array architecture may identify a first file corresponding with a received storage block request and select one or more additional files for prefetching based on their association with the first file in an operating system or application log file or other data structure. The storage blocks corresponding with these additional files are then prefetched.

In still a further example of heuristic-based prefetching, the storage block access optimizer can record a history or log of the sequence of storage blocks accessed by a storage client. The storage block access optimizer can compare subsequent sequences of storage block requests with previously recorded sequences of storage requests. If a subsequent sequence of storage block requests from the storage client matches a portion of a previously recorded sequence of storage requests, the storage block access optimizer can prefetch some or all of the storage blocks in the remaining portion of the recorded sequence.

Yet further embodiments of methods 200 and 255 monitor the times at which high-level data structure entities are accessed. This technique is referred to as access time-based prefetching. In an embodiment of access time-based prefetching, high-level data structure entities that are accessed at approximately the same time are associated together by the virtual storage array architecture. For example, the virtual storage array architecture may analyze the most recent access times of high-level data structure entities, such as files in the same or related directories, and group these high-level data structure entities into a relatively small number of sets accordingly. For example, if a storage client previously requested storage blocks from files A, B, and C at approximately the same time, such as within several minutes of each other, these files may be assigned to a single set. Embodiments of the virtual array architecture may perform this analysis as a preprocessing phase or while processing storage requests from storage clients.

In an embodiment of access time-based prefetching, method 200 receives a storage block request for a storage block in step 205. Steps 210 to 225 are performed as described above, with step 225 identifying the high-level data structure entity, such as a file, associated with the storage block. In this embodiment, step 230 determines if the identified high-level data structure entity is associated with a set of high-level data structure entities that were all previously accessed at approximately the same time.

For example, an embodiment of step 230 may access the ISSD or another data structure to identify other high-level data structure entities previously accessed at approximately the same time. In another example, if the high-level data structure entity identified in step 225 is a file, step 230 may access a directory including this file and search file system metadata for other files in this directory or its subdirectories that were previously accessed at approximately the same time as the identified file's previous access.

Once step 230 has identified one or more additional high-level data structure entities previously accessed at approximately the same time as the identified high-level data structure entity, step 230 may select one or more of these additional high-level data structure entities for prefetching. In an embodiment, step 230 sorts the additional high-level data structure entities in order of size and selects the additional high-level data structure entities for prefetching from smallest to largest, up to a total size or quantity threshold value. Once one or more additional high-level data structure entities are selected, method 200 proceeds through step 235 to 250 as described above.

In an embodiment, step 265 of method 255 may perform access time-based prefetching in a manner similar to step 230.

Further embodiments of the virtual array storage architecture may process additional levels of abstraction of high-level data structure entities to perform prefetching optimizations. For example, many virtual machine applications use a virtual machine disk image file to implement virtual machine data storage device. Examples of virtual machine image file formats include VMDK, VHD, Virtual Desktop Image, Oracle VM Image format, and qcow. The virtual machine disk image file is used by the hosted or guest operating system of the virtual machine as a virtual machine data storage device. The virtual machine may read and write to this virtual machine data storage device using file system operations. The virtual machine application translates these virtual machine file system operations into operations on the underlying virtual machine data file.

Embodiments of the above-described prefetching techniques may be applied to virtual machine disk image files and other high-level data structure entities with multiple layers of abstraction. For example, an application executing within virtual machine may request a file from its virtual data storage device. The virtual machine application translates this request into a corresponding request for a portion of a virtual machine disk image file. A file server translates this request for the portion of the virtual machine disk image file into a storage request for one or more storage blocks from the virtual storage array.

In this example, the branch or data center virtual storage array interface receives this request for one or more storage blocks and uses the ISSD to identify the corresponding portion of the virtual machine disk image file. Additionally, an embodiment of the virtual array architecture parses the internal structure of the virtual machine disk image file to identify the file requested by the application hosted by the virtual machine. For example, an embodiment of virtual array architecture may parse the internal virtual disk image data structures representing the master file table, boot record, partition table, or other file system structures of the virtual machine data storage device.

By parsing the internal virtual disk image data structures, an embodiment of the virtual storage array architecture may identify additional portions of this file or other files for prefetching using the techniques described above. Once one or more files or portions thereof in a virtual machine data storage device have been identified for prefetching, an embodiment of the virtual storage array architecture applies this parsing in reverse to identify and prefetch the corresponding storage blocks of the virtual storage array.

Figure 3:
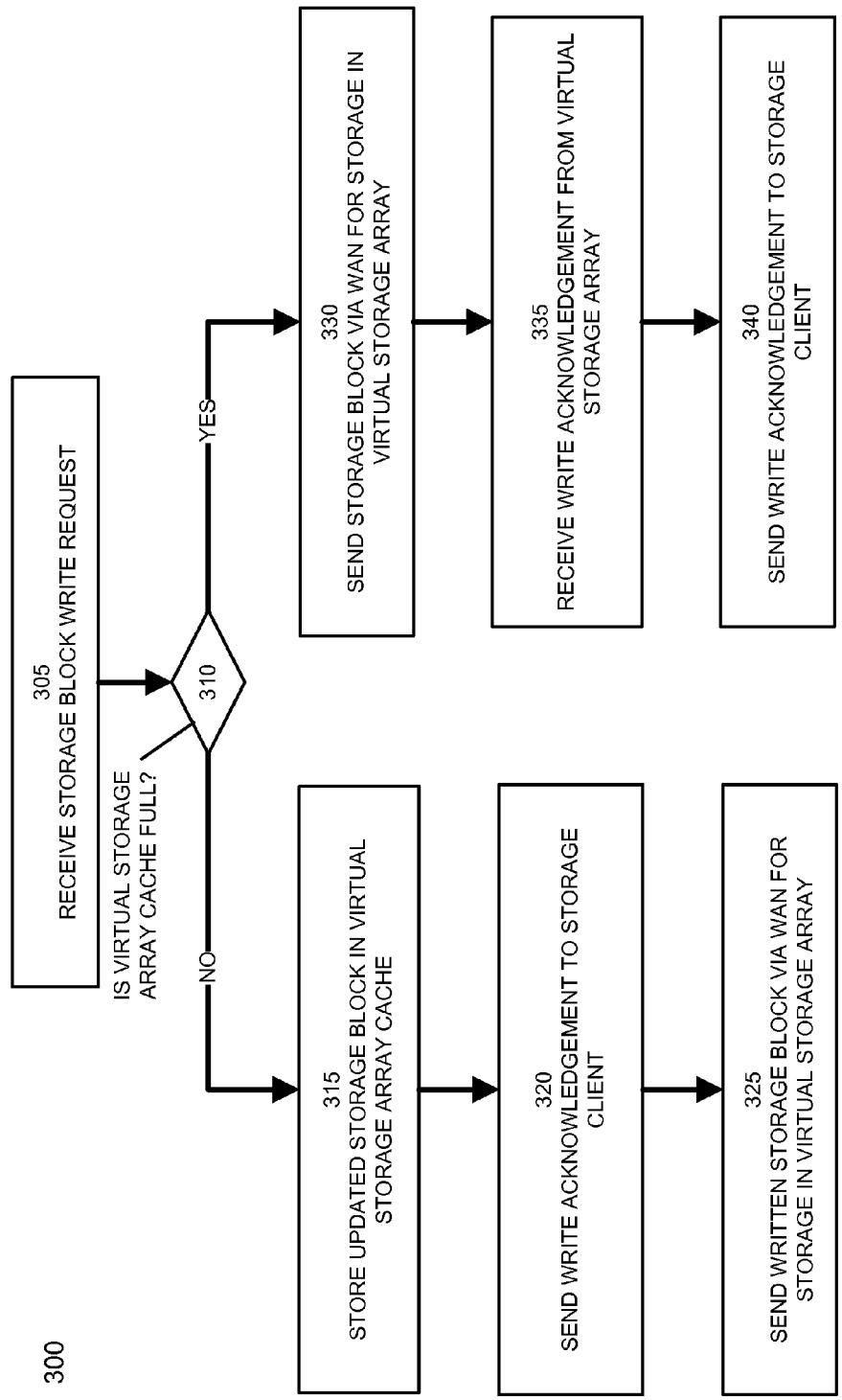
FIG. 3 illustrates a method of processing storage block write requests to improve virtualized data storage system performance according to an embodiment of the invention.

Similarly, the virtual storage array cache can be used to hide latency and bandwidth limitations of the WAN during virtual storage array writes. FIG. 3 illustrates a method 300 of processing storage block write requests to improve virtualized data storage system performance according to an embodiment of the invention.

An embodiment of method 300 starts with step 305 receiving a storage block write request from a storage client within the branch location LAN. The storage block write request may be received from a storage client by a branch location virtual storage interface.

In response to the receipt of the storage block write request, decision block 310 determines if the storage block write cache in the virtual storage array cache at the branch location is capable of accepting additional write requests or is full. In an embodiment, the virtual storage array cache may use some or all of its storage as a storage block write cache for pending virtual storage array write operations.

If the storage block write cache in the virtual storage array cache can accept an additional storage block write request, then step 315 stores the storage block write request, including the storage block data to be written, in the storage block write cache. Step 320 then sends a write acknowledgement to the storage client. Following the storage client's receipt of this write request, the storage client believes its storage block write request is complete and can continue to operation normally. Step 325 then transfers the queued written storage block via the WAN to the physical storage array at the data center LAN. This transfer may occur in the background and asynchronously with the operation of storage clients.

While a storage block write request is queued in the storage block write cache and waiting to be transferred to the data center, a storage client may wish to access this storage block for a read or an additional write. In this situation, the virtual storage array interface intercepts the storage block access request. In the case of a storage block read, the virtual storage array interface provides the storage client with the previously queued storage block. In the case of a storage block write, the virtual storage array interface will update the queued storage block data and send a write acknowledgement to the storage client for this additional storage block access.

Conversely, if decision block 310 determines that the storage block read cache cannot accept an additional storage block write request, then step 330 transfers the storage block via the WAN to the physical storage array at the data center LAN prior to sending a write acknowledgement to the storage client. In an embodiment of step 335, the branch location virtual storage array interface receives a write confirmation that the storage block write operation is complete. This confirmation may be received from a data center virtual storage array interface or directly from a physical storage array or other data storage device. Following completion of this transfer, step 340 sends a write acknowledgement to the storage client, allowing the storage client to resume normal operation.

In a further embodiment, a branch location virtual storage array interface may throttle storage block read and/or write requests from storage clients to prevent the virtual storage array cache from filling up under typical usage scenarios.

As discussed above, the data of a virtual storage array may be stored in physical storage array or other data storage device. In some applications, such as with virtual machine applications, the physical storage blocks used by the virtual storage array belong to a virtual machine file system, such as VMFS. In these applications, there may be many layers of abstraction between virtual storage array storage blocks and the high-level data structure entities used by a virtual machine application and its hosted applications. Because of this, embodiments of the invention may perform multiple transformations to identify high-level data structure entities corresponding with given virtual storage array storage blocks and, once these high-level data structure entities are identified, may perform multiple optimizations to attempt to predict and prefetch virtual storage array storage blocks that will be requested by a storage client in the near future.

Figure 4:
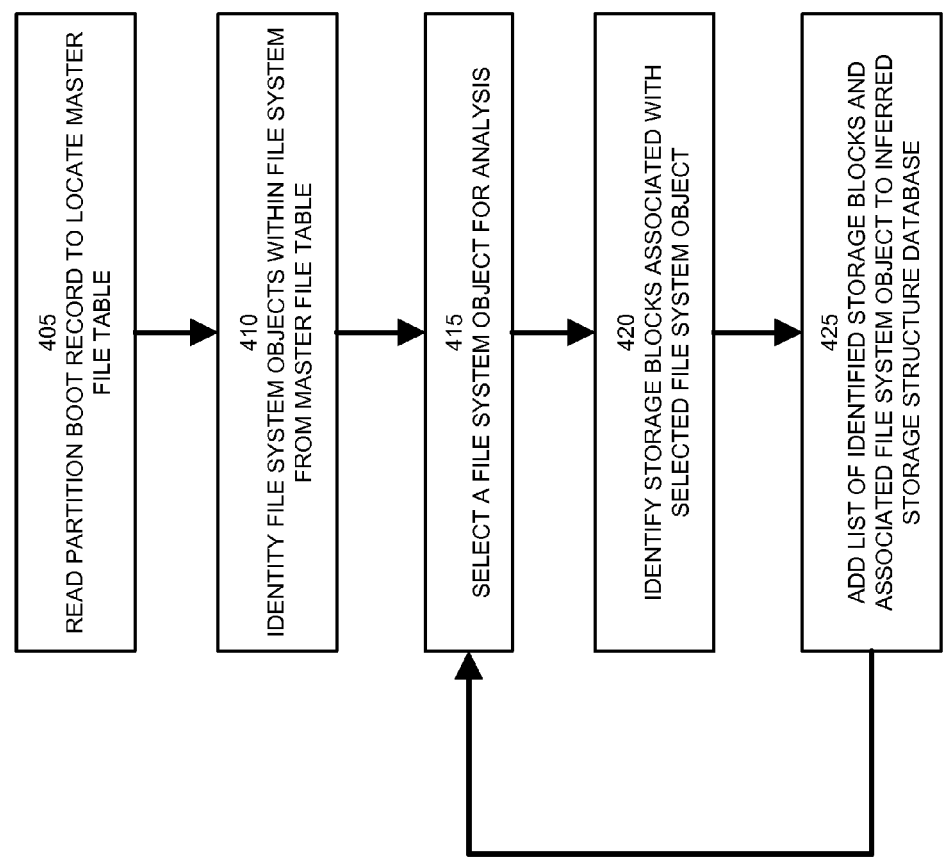
FIG. 4 illustrates a method of creating an inferred storage structure database to improve virtualized data storage system performance according to an embodiment of the invention.

FIG. 4 illustrates a method 400 of creating an inferred storage structure database to improve virtualized data storage system performance according to an embodiment of the invention. Step 405 of method 400 reads a partition boot record from a virtual storage array to locate a master file table or similar file system data structure for a file system implemented by the virtual storage array. In this embodiment, the file system is an NTFS file system and the master file table provides a record of every file, directory, and other entities within the file system.

Step 410 accesses the master file table or other similar file system data structure to identify all of the file system objects, such as files and directories, within the file system. In an embodiment, step 410 accesses the file records within the master file table to identify all of the files, directories, and other file system objects within the file system. These may be located within the $data attribute field of the master file table of an NTFS file system.

Step 415 selects one of the files, directories, or other file system objects identified in step 410 for processing. Step 420 identifies the storage blocks associated with the selected file, directory, or file system object. These storage blocks are used to store the data and other attributes of the selected file system object. In an embodiment, step 420 reads the $data, $bitmap, $security_descriptor, $index_allocation, and $attribute_list attributes in each file record to identify all of the storage blocks used by the selected file. For some file system objects, such as large files, a portion of the list of storage blocks used by the file may be stored in records outside of the master file table. For these types of file system objects, step 420 may recursively process one or more file system records to identify all of the storage blocks used by a file system object.

Step 425 adds the file system object and its associated storage blocks to the inferred storage structure database. In an embodiment, step 425 adds the file system object and its associated storage blocks to a first data structure that is indexed or keyed based on the file system object. This allows virtual storage array interfaces and/or the storage block access optimizer to map a given file system object to its corresponding storage blocks. In this embodiment, step 425 also adds the file system object and its associated storage blocks to a second data structure that is indexed or keyed based on storage blocks. This allows virtual storage array interfaces and/or the storage block access optimizer to map a given storage block to its corresponding file system object. In an alternate embodiment, the inferred storage structure database combines the first and second data structures. In either embodiment, file system objects may be identified using any type of unique identifier, including an inode number assigned by the file system to the file system object. Similarly, storage blocks may be identified using any type of unique identifier, including a logical storage block or cluster number.

Following step 425, method 400 returns to step 415 to process another file system object. Steps 415 to 425 of method 400 may be repeated until all of the file system objects have been processed and the inferred storage structure database is updated with all of the associations between file system objects and storage blocks.

Embodiments of method 400 may be performed during the initialization of the virtual storage array and prior to the virtual storage array accepting storage requests from storage clients. Alternatively, embodiments of method 400 may be performed as a parallel or background process while the virtual storage array services storage requests from storage clients. In this case, the perceived performance of the virtual storage array will improve as more file system objects are processed, enabling the virtual array architecture to prefetch more storage blocks. Embodiments of the virtual array architecture may use the storage block access optimizer and/or a branch location or data center virtual storage array interface to perform method 400.

The method 400 illustrates the creation of an inferred storage structure database for a virtual storage array implementing an NTFS file system. However, embodiments of method 400 may be similarly applied to other types of file systems, such as FAT and FAT32, HFS and HFS+, the ext family of file systems, and virtual machine file systems such as VMFS.

In an embodiment, method 400 may be used to update the inferred storage structure database by periodically scanning the high-level data structure entities or by monitoring storage client activity for changes or additions to the virtual storage array, which is then used to update the affected portions of the ISSD.

Figure 5A:
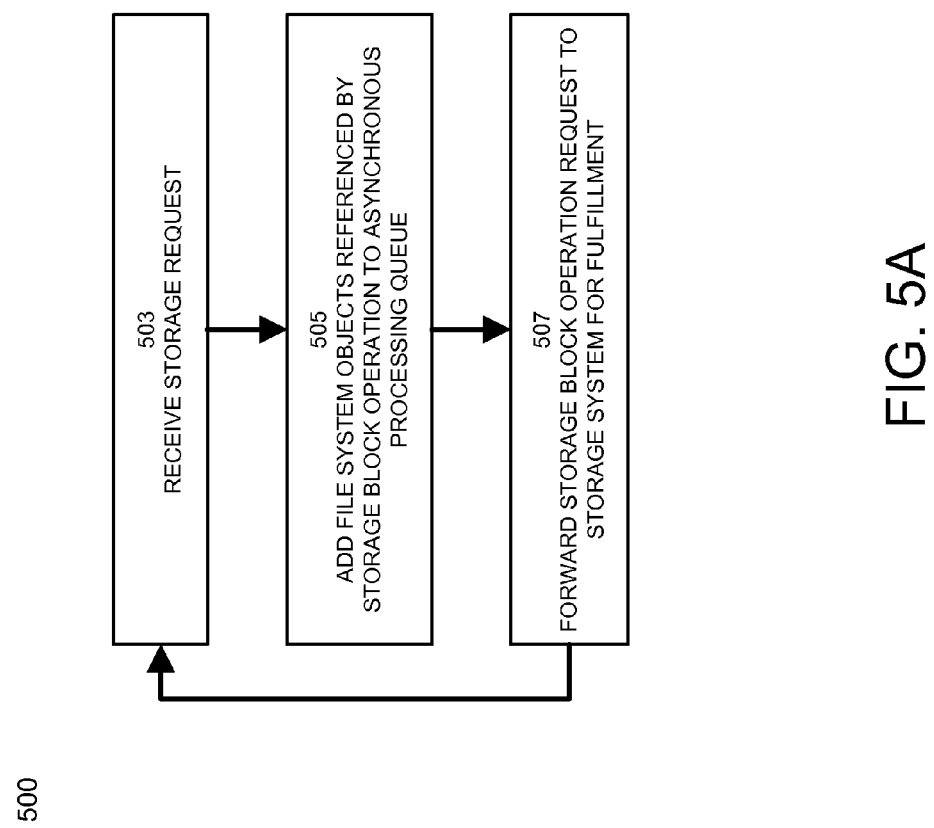
Figure 5B:
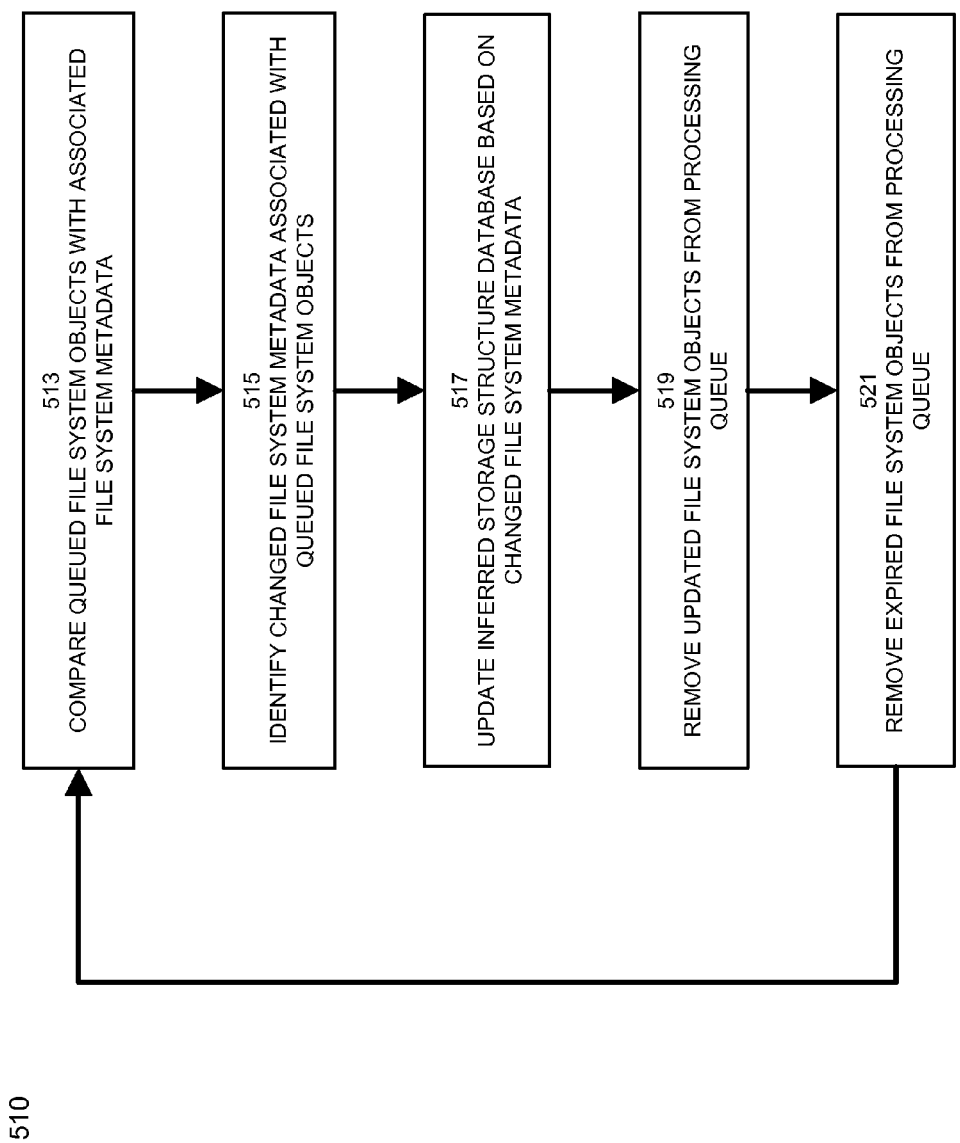

As an alternative to using method 400 to update the inferred storage structure database following an initial processing of file system objects, FIGS. 5A-5C illustrate methods of updating an inferred storage structure database to improve virtualized data storage system performance according to an embodiment of the invention.

FIG. 5A illustrates a first portion 500 of a first method for updating the inferred storage structure database according to an embodiment of the invention. Portion 500 of the first method begins with step 503 receiving a storage request from a storage client. The storage request may be a write request or a delete request for one or more storage blocks. The storage blocks targeted by the storage request may be previously unassociated with any file system object or other high-level data structure entity (for example writing a new file or adding a large amount of data to a previously existing file) or may be previously associated with a file system object or other high-level data structure entity (for example appending a small amount of data to an existing file or deleting or truncating an existing file).

Step 505 adds one or more file system objects referenced by the storage request to an asynchronous processing queue. Because storage requests reference storage blocks, not file system objects or other high-level data structure entities, an embodiment of step 505 accesses the inferred storage structure to identify the file system objects, such as the inode numbers, corresponding with the storage blocks referenced by the storage request. If a storage block is associated with a new file, the storage requests will include a write to a storage block corresponding with the master file table or other file system metadata structure. In an embodiment, step 505 can identify the inodes or other file system objects corresponding with a storage block in a new file from the changes to the master file table or other file system metadata structure. In an embodiment, the asynchronous processing queue includes records, such as a time stamp or counter value, indicating the type of storage operation associated with the storage request and indicating the time when each file system object was added to the asynchronous processing queue.

Once the file system objects associated with the storage request are added to the asynchronous processing queue, step 507 forwards the storage request on to the physical storage array for processing.

FIG. 5B illustrates a second portion 510 of the first method for updating the inferred storage structure database according to an embodiment of the invention. Embodiments of portion 510 may be executed asynchronously and in parallel with the first portion of method 500.

Because a storage request may potentially reference multiple file system objects, the virtual storage array cannot determine which file system objects have been added, deleted, or modified from the storage request alone. The second portion 510 of the first method monitors file system metadata to identifies which file system objects are actually changed by a storage request and updates the inferred storage structure database accordingly.

Step 513 compares the file system objects, such as inodes, in the asynchronous processing queue with their corresponding file system metadata attributes. For example, the master file table of an NTFS file system includes a $bitmap attribute that identifies inodes in use. An embodiment of step 513 compares each inode or other file system object in the asynchronous processing queue with its corresponding $bitmap attribute entry or other file system metadata.

Step 515 identifies any changes in file system metadata corresponding with the file system objects in the asynchronous processing queue. For example, if a storage request is writing a new file, portion 500 of this method will add all of the inodes potentially affected by this storage request to the queue. In portion 510, step 515 will determine if the $bitmap attribute entries associated with these queued inode are changed to indicate that an inode is in use. In another example, if a storage request is deleting an existing file, portion 500 of this method will add all of the inodes potentially affected by this storage request to the queue. In portion 510, step 515 will determine if the $bitmap attribute entries associated with these queued inode are changed to indicate that the inodes are no longer in use. In yet another, example, if a storage request is appending data to or truncating data from an existing file, portion 500 of this method will add all of the inodes potentially affected by this storage request to the queue. In portion 510, step 515 rescans the file metadata associated with these inodes to detect any changes to any file metadata attributes.

Step 517 updates the inferred storage structure database based on the changes to the file system metadata identified in step 515. For example, if step 515 detects that the $bitmap attribute entry associated with a queued inode is changed to indicate that an inode is in use, indicating the creation of a new file, step 517 adds this inode and its associated storage blocks to the inferred storage structure database. In another example, if step 515 detects that the $bitmap attribute entry associated with a queued inode is changed to indicate that the inode is no longer in use, step 517 removes the inode and its associated storage blocks from the inferred storage structure database. In yet another example, if step 515 detects that file metadata associated with a queued inode has changed, step 517 removes the previous entries for the inode and its associated storage blocks from the inferred storage structure database and replaces these with updated entries determined from the rescanning the file metadata.

Following step 517, step 519 removes these changed file system objects from the queue, as the inferred storage structure database has been updated for these file system objects.

Because the storage request is processed by the storage array after file system objects are added to the queue, the file system metadata may not be updated immediately. Thus, an embodiment of this method keeps file system objects in the queue for a period of time to see if their corresponding file system metadata is eventually updated. Step 521 evaluates the duration of time that the inodes have spent in the queue. If the queued time duration of an inode exceeds a threshold value, such as one minute, step 521 removes this inode from the queue. The threshold value is set to give adequate time for the storage array to update the file system metadata based on inodes that are added, removed, or changed due to a storage request. Additionally, the threshold value is set to be sufficiently short that the there are not too many inodes in the queue, which would increase the processing burden for monitoring the queue and file system metadata for changes.

Following step 521, portion 510 of this first method may return to step 513 to process any inodes in the queue, including previously monitored inodes that have not passed the threshold time and any inodes asynchronously added to the queue by portion 500 of this method in response to additional storage requests.

As an alternative to the first method illustrated by portions 500 and 510 in FIGS. 5A and 5B, FIG. 5C illustrates a second method 530 for updating the inferred storage structure database according to an embodiment of the invention. Step 533 stores a copy of the storage block usage information from the file system metadata. In an embodiment, this may be a copy of the $bitmap attribute field from the master file table, which indicates the usage of storage blocks by the file system.

Step 534 reads the file system metadata to determine the current storage block usage information. In an embodiment, step 534 reads the $bitmap attribute field from the master file table. Step 535 compares the current storage block usage information with the previously stored copy of the storage block usage information to determine if any of the storage block usage information has changed. If not, method 530 returns to step 534 to read the storage block usage information again. In an embodiment, a time delay may be introduced between iterations of steps 534 and 535.

Conversely if step 535 determines that the storage block usage information has changed from the previously stored copy, step 537 uses the changed portions of the storage block usage information to identify the changed storage blocks in the file system. Step 539 identifies the file system objects, such as inodes representing files and directories, that correspond with the changed storage blocks.

Step 541 updates the inferred storage structure database with the changed file system objects and storage blocks. For example, if the storage block usage information is changed to indicate that a formerly unused storage block is now in use, step 541 adds the corresponding file system object, such as an inode, and its associated storage blocks to the inferred storage structure database. In another example, if the storage block usage information is changed to indicate that a formerly used storage block is now no longer in use, step 541 removes the corresponding file system object, such as an inode, and storage block from the inferred storage structure database.

Following step 541, an embodiment of method 530 returns to step 533, which replaces the copy of the storage block usage information with a copy of the current storage block usage information.

As discussed above, the data of a virtual storage array may be stored in physical storage array or other data storage device. In some applications, such as with virtual machine applications, the physical storage blocks used by the virtual storage array belong to a virtual machine file system, such as VMFS. In these applications, there may be many layers of abstraction between virtual storage array storage blocks and the high-level data structure entities used by a virtual machine application and its hosted applications. Because of this, embodiments of the invention may perform multiple transformations to identify high-level data structure entities corresponding with given virtual storage array storage blocks and, once these high-level data structure entities are identified, may perform multiple optimizations to attempt to predict and prefetch virtual storage array storage blocks that will be requested by a storage client in the near future.

Figure 6:
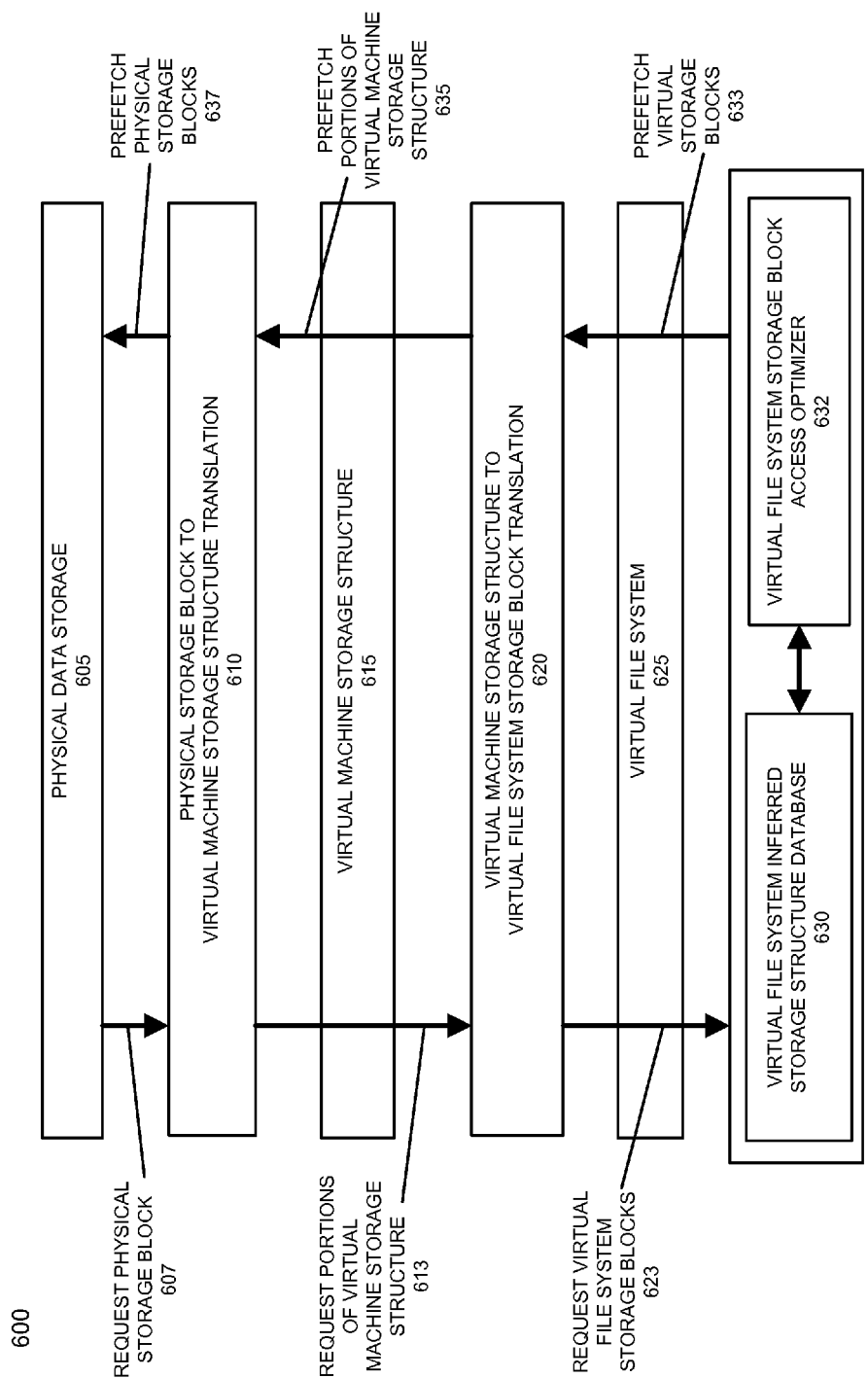
FIG. 6 illustrates an example virtual machine implementation of a portion of a virtualized data storage system performance according to an embodiment of the invention.

FIG. 6 illustrates an example arrangement 600 for successively applying transformations and optimizations to improve virtualized data storage system performance according to an embodiment of the invention. In example 600, successive levels of translation may be used to convert storage block requests to corresponding intermediate level data structure entities and then into corresponding high-level data structure entities. Example arrangement 600 includes a physical data storage system 605, such as a physical data storage array or file server. The physical data storage system 605 may be associated with a file system or volume manager that provides an interface for accessing physical storage blocks. In this example arrangement 600, a virtual storage array interface receives a request for a virtual storage array storage block from a storage client. This request for a virtual storage array storage block is converted by one or more virtual storage array interfaces to a request 607 for a corresponding physical storage block in the physical data storage system 605.

To identify additional physical storage blocks for prefetching, example arrangement 600 includes a physical storage block to virtual machine storage structure translation module 610. Module 610 maps a given physical storage block to a corresponding portion of a virtual machine storage structure 615. For example, virtual machine storage structure 615 may be a VMFS storage volume. The VMFS storage volume appears as a logical storage unit, such as a LUN, to the virtual storage array interface. In this example, the VMFS storage volume may include multiple virtual machine disk images. Although the VMFS storage volume appears as a single logical storage unit to the storage client, each disk image within the VMFS storage volume appears to a virtual machine application as a separate virtual logical storage unit. In this example, module 610 may identify a portion of a virtual logical storage unit within the VMFS storage volume as corresponding with the requested physical storage block.

Module 620 maps the identified portion of a virtual machine storage structure, such as a virtual logical storage unit within a VMFS storage volume, to one or more corresponding virtual file system storage blocks within a virtual file system 625. Virtual file system 625 may be any type of file system implemented within a virtual logical storage unit. Examples of virtual file systems include FAT, NTFS, and the ext family of file systems. For example, a virtual logical storage unit may be a disk image used by a virtual machine application. The disk image represents as data as virtual storage blocks of a virtual data storage device. The virtual storage blocks in this disk image are organized according to the virtual file system 625.

As with physical storage blocks and physical file systems, virtual machine applications and their hosted applications typically access data in terms of files in the virtual file system 625, rather than storage blocks. Moreover, high-level data structure entities within the virtual file system, such as files or directories, may be spread out over multiple non-contiguous virtual storage blocks in the virtual file system 625. Thus, a virtual file system inferred storage structure database 630 and virtual file system block access optimizer 632 leverage an understanding of the semantics and structure of the high-level data structures associated with the virtual storage blocks to predict which virtual storage blocks are likely to be requested by a storage client in the near future. The virtual file system ISSD 630 and virtual file system block access optimizer 632 are similar to the ISSD and block access optimizer, respectively, for physical data storage discussed above.

In arrangement 600, the virtual file system block access optimizer 632 receives an identification of one or more virtual storage blocks in the virtual file system 625 that correspond with the requested physical storage block in request 607. The virtual file system block access optimizer 632 uses the virtual file system ISSD 630 to identify one or more virtual file system high-level data structure entities, such as virtual file system files, corresponding with these virtual file system storage blocks. The virtual file system block access optimizer 632 uses its knowledge of the high-level data structure entities and reactive and/or proactive prefetching techniques to identify one or more additional high-level data structure entities or portions thereof for prefetching. The virtual file system block access optimizer 632 then uses the virtual file system ISSD 630 to identify additional virtual storage blocks in the virtual file system 625 corresponding with these additional high-level data structure entities or portions thereof. The additional virtual storage blocks in the virtual file system 625 are selected for prefetching.

Once the virtual file system block access optimizer 632 has selected one or more virtual file system storage blocks for prefetching, a request 633 for these virtual file system storage blocks is generated. In an embodiment of arrangement 600, module 620 translates the prefetch request 633 for virtual file system storage blocks into an equivalent prefetch request 635 for a portion of the virtual machine storage structure. Then, module 610 translates the prefetch request 625 for a portion of the virtual machine storage structure into an equivalent prefetch request 637 for physical storage blocks in the physical data storage system 605. The physical storage blocks indicated by request 637 correspond with the virtual file system storage blocks from request 633. These requested physical storage blocks may be retrieved from the physical data storage system 605 and communicated via the WAN to a branch location virtual storage array interface for storage in a storage block read cache.

Arrangement 600 is one example for successively applying transformations and optimizations to improve virtualized data storage system performance according to an embodiment of the invention. Further embodiments of the invention may apply any number of successive transformations to physical storage blocks to identify associated high-level data structure entities. Additionally, once one or more associated high-level data structure entities have been identified, embodiments of the invention may apply optimizations at the level of high-level data structure entities or at any lower level of abstraction. For example, optimizations may be performed at the level of virtual machine file system files, virtual machine file system storage blocks, virtual machine storage structures, physical storage blocks, and/or at any other intermediate data structure level of abstraction.

As discussed above, the data of a virtual storage array may be stored in physical storage array or other data storage device. In some applications, such as with virtual machine applications, the physical storage blocks used by the virtual storage array belong to a virtual machine file system, such as VMFS. In these applications, there may be many layers of abstraction between virtual storage array storage blocks and the high-level data structure entities used by a virtual machine application and its hosted applications. Because of this, embodiments of the invention may perform multiple transformations to identify high-level data structure entities corresponding with given virtual storage array storage blocks and, once these high-level data structure entities are identified, may perform multiple optimizations to attempt to predict and prefetch virtual storage array storage blocks that will be requested by a storage client in the near future.

FIG. 6 illustrates an example arrangement 600 for successively applying transformations and optimizations to improve virtualized data storage system performance according to an embodiment of the invention. In example 600, successive levels of translation may be used to convert storage block requests to corresponding intermediate level data structure entities and then into corresponding high-level data structure entities. Example arrangement 600 includes a physical data storage system 605, such as a physical data storage array or file server. The physical data storage system 605 may be associated with a file system or volume manager that provides an interface for accessing physical storage blocks. In this example arrangement 600, a virtual storage array interface receives a request for a virtual storage array storage block from a storage client. This request for a virtual storage array storage block is converted by one or more virtual storage array interfaces to a request 607 for a corresponding physical storage block in the physical data storage system 605.

To identify additional physical storage blocks for prefetching, example arrangement 600 includes a physical storage block to virtual machine storage structure translation module 610. Module 610 maps a given physical storage block to a corresponding portion of a virtual machine storage structure 615. For example, virtual machine storage structure 615 may be a VMFS storage volume. The VMFS storage volume appears as a logical storage unit, such as a LUN, to the virtual storage array interface. In this example, the VMFS storage volume may include multiple virtual machine disk images. Although the VMFS storage volume appears as a single logical storage unit to the storage client, each disk image within the VMFS storage volume appears to a virtual machine application as a separate virtual logical storage unit. In this example, module 610 may identify a portion of a virtual logical storage unit within the VMFS storage volume as corresponding with the requested physical storage block.

Module 620 maps the identified portion of a virtual machine storage structure, such as a virtual logical storage unit within a VMFS storage volume, to one or more corresponding virtual file system storage blocks within a virtual file system 625. Virtual file system 625 may be any type of file system implemented within a virtual logical storage unit. Examples of virtual file systems include FAT, NTFS, and the ext family of file systems. For example, a virtual logical storage unit may be a disk image used by a virtual machine application. The disk image represents as data as virtual storage blocks of a virtual data storage device. The virtual storage blocks in this disk image are organized according to the virtual file system 625.

As with physical storage blocks and physical file systems, virtual machine applications and their hosted applications typically access data in terms of files in the virtual file system 625, rather than storage blocks. Moreover, high-level data structure entities within the virtual file system, such as files or directories, may be spread out over multiple non-contiguous virtual storage blocks in the virtual file system 625. Thus, a virtual file system inferred storage structure database 630 and virtual file system block access optimizer 632 leverage an understanding of the semantics and structure of the high-level data structures associated with the virtual storage blocks to predict which virtual storage blocks are likely to be requested by a storage client in the near future. The virtual file system ISSD 630 and virtual file system block access optimizer 632 are similar to the ISSD and block access optimizer, respectively, for physical data storage discussed above.

In arrangement 600, the virtual file system block access optimizer 632 receives an identification of one or more virtual storage blocks in the virtual file system 625 that correspond with the requested physical storage block in request 607. The virtual file system block access optimizer 632 uses the virtual file system ISSD 630 to identify one or more virtual file system high-level data structure entities, such as virtual file system files, corresponding with these virtual file system storage blocks. The virtual file system block access optimizer 632 uses its knowledge of the high-level data structure entities and reactive and/or proactive prefetching techniques to identify one or more additional high-level data structure entities or portions thereof for prefetching. The virtual file system block access optimizer 632 then uses the virtual file system ISSD 630 to identify additional virtual storage blocks in the virtual file system 625 corresponding with these additional high-level data structure entities or portions thereof. The additional virtual storage blocks in the virtual file system 625 are selected for prefetching.

Once the virtual file system block access optimizer 632 has selected one or more virtual file system storage blocks for prefetching, a request 633 for these virtual file system storage blocks is generated. In an embodiment of arrangement 600, module 620 translates the prefetch request 633 for virtual file system storage blocks into an equivalent prefetch request 635 for a portion of the virtual machine storage structure. Then, module 610 translates the prefetch request 625 for a portion of the virtual machine storage structure into an equivalent prefetch request 637 for physical storage blocks in the physical data storage system 605. The physical storage blocks indicated by request 637 correspond with the virtual file system storage blocks from request 633. These requested physical storage blocks may be retrieved from the physical data storage system 605 and communicated via the WAN to a branch location virtual storage array interface for storage in a storage block read cache.

Arrangement 600 is one example for successively applying transformations and optimizations to improve virtualized data storage system performance according to an embodiment of the invention. Further embodiments of the invention may apply any number of successive transformations to physical storage blocks to identify associated high-level data structure entities. Additionally, once one or more associated high-level data structure entities have been identified, embodiments of the invention may apply optimizations at the level of high-level data structure entities or at any lower level of abstraction. For example, optimizations may be performed at the level of virtual machine file system files, virtual machine file system storage blocks, virtual machine storage structures, physical storage blocks, and/or at any other intermediate data structure level of abstraction.

Figure 7:
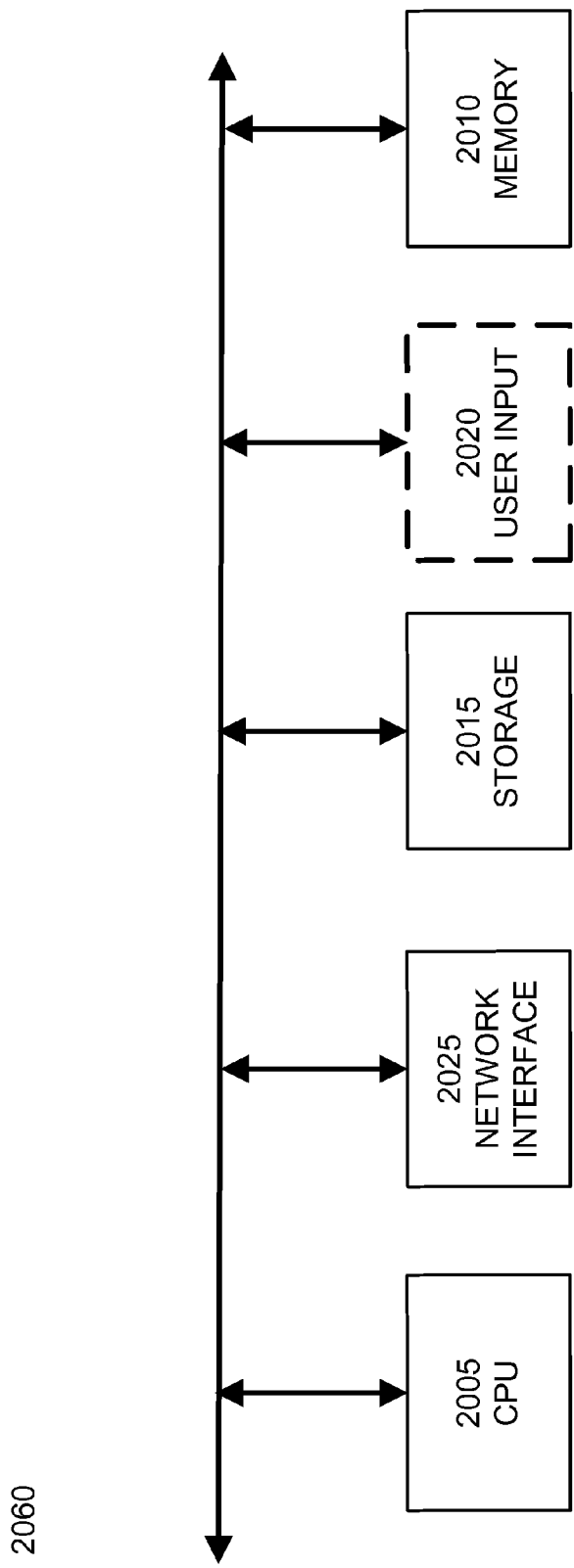
FIG. 7 illustrates an example computer system capable of a virtualized data storage system device according to an embodiment of the invention.

Embodiments of the invention can implement virtual storage array interfaces at the branch and/or data center as standalone devices or as part of other devices, computer systems, or applications. FIG. 7 illustrates an example computer system capable of implementing a virtual storage array interface according to an embodiment of the invention. FIG. 7 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, or other magnetic, optical, or solid state storage devices. In an embodiment, storage 2015 includes multiple storage devices configured to act as a storage array for improved performance and/or reliability. In a further embodiment, storage 2015 includes a storage array network utilizing a storage array network interface and storage array network protocols to store and retrieve data. Examples of storage array network interfaces suitable for use with embodiments of the invention include Ethernet, Fibre Channel, IP, and InfiniBand interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art after reading the attached documents. For example, embodiments of the invention can be used with any number of network connections and may be added to any type of network device, client or server computer, or other computing device in addition to the computer illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of maintaining a data structure configured to associate storage blocks with corresponding file system objects, the method comprising:
   receiving a storage request from a storage client, wherein the storage request includes a reference to at least one storage block in a file system;
   identifying at least a first file system object associated with the referenced storage block based on a first data structure that associates storage blocks with file system objects, wherein the first data structure is different from a second data structure that is used by the file system to associate storage blocks with file system objects;
   monitoring first file system metadata in the file system associated with the first file system object to detect at least one change to the first file system metadata in response to the storage request;
   in response to the detection of a change in the first file system metadata, updating a first portion of the first data structure associating the referenced storage block with the first file system object, wherein the change in the first file system metadata indicates a deletion of an existing file system object in the file system, and wherein updating the first portion of the first data structure comprises:
      scanning the second data structure to identify a first set of storage blocks associated with the first file system object, wherein the first set of storage blocks includes the referenced storage block;
      removing the first file system object from the first data structure; and
      removing an association of the first file system object with the first set of storage blocks from the first data structure; and
   identifying a second file system object for prefetching based on the first file system object.

2. The method of claim 1, wherein the monitoring the first file system metadata and the second file system metadata is performed for a first time duration.

3. The method of claim 1, wherein the change in the first file system metadata indicates the creation of a new file system object, and wherein updating the first portion of the data structure comprises:
   adding the first file system object to the data structure; and
   adding an association of the first file system object with the referenced storage block to the data structure.

4. The method of claim 1, wherein the change in the first file system metadata indicates a change to an existing file system object in the file system, and wherein updating the first portion of the data structure comprises:
   scanning a file system metadata structure to identify a first set of storage blocks associated with the first file system object, wherein the first set of storage blocks includes the referenced storage block;
   adding the first file system object to the data structure; and
   adding an association of the first file system object with the first set of storage blocks to the data structure.

5. A method of maintaining a data structure configured to associate storage blocks with corresponding file system objects, the method comprising:
   upon forwarding one or more storage requests to a storage device for processing, adding one or more file system objects to an asynchronous processing queue, wherein the one or more file system objects are associated with one or more storage blocks referenced in the one or more storage requests;

asynchronously and in parallel to the one or more storage requests being processed by the storage device, performing at least the following operations on the one or more file system objects stored in the asynchronous processing queue:

monitoring storage block usage information in file system metadata to detect a change in storage block usage; and in response to detecting at least one change in the storage block usage information in the file system metadata:

identifying at least one changed storage block from the storage block usage information;

identifying at least one file system object corresponding with the changed storage block based on a first data structure that associates storage blocks with file system objects, wherein the first data structure is different from a second data structure that is used by the file system to associate storage blocks with file system objects; and updating at least a first portion of a first data structure associating the changed storage block with the file system object, wherein the change in the file system metadata indicates a deletion of an existing file system object in the file system, and wherein updating the first portion of the first data structure comprises:

removing the file system object from the first data structure; and removing an association of the file system object with at least the changed storage block from the first data structure; and identifying additional file system objects for prefetching based on the at least one file system object.

6. The method of claim 5, wherein the change in the storage block usage information indicates the creation of the file system object, and wherein updating the first portion of the data structure comprises:

adding the file system object to the data structure; and adding an association of the file system object with the changed storage block to the data structure.

7. The method of claim 5, wherein the change in the storage block usage information indicates a change to an existing file system object in the file system, and wherein updating the first portion of the data structure comprises:

adding an association of the file system object with the changed storage block to the data structure.

8. The method of claim 5, wherein the change in the storage block usage information indicates a change to an existing file system object in the file system, and wherein updating the first portion of the data structure comprises:

adding an association of the file system object with the changed storage block to the data structure.

9. A method of optimizing data access using a storage block protocol over a wide-area network, the method comprising:

upon forwarding one or more storage requests to a storage device for processing, adding one or more file system objects to an asynchronous processing queue, wherein the one or more file system objects are associated with one or more storage blocks referenced in the one or more storage requests; and asynchronously and in parallel to the one or more storage requests being processed by the storage device, performing at least the following operations on the one or more file system objects stored in the asynchronous processing queue:

identifying a first portion of a first file system object in a file system corresponding with a first storage block based on a first data structure that associates storage blocks with file system objects, wherein when the file system objects are deleted, the file system objects and their associations with the storage blocks are removed from the first data structure based on a second data structure, wherein the first data structure is different the second data structure that is used by the file system to associate storage blocks with file system objects, wherein the first file system object is in the asynchronous processing queue;

selecting a second portion of the first file system object in the file system for prefetching, wherein the selection is based on a proximity of the second portion of the first file system object to the first portion of the first file system object, wherein the second portion of the first file system object has not been requested by a storage client, but is likely to be requested in the near future by the storage client;

identifying at least a second storage block corresponding with the second portion of the first file system object;

retrieving the second storage block from the data storage connected with a wide area network at a first network location;

communicating via the wide area network the second storage block from the first network location to a storage block cache at a second network location; and storing the second storage block in the storage block cache.

10. The method of claim 9, wherein receiving the selection of the first storage block comprises:

receiving a storage request from a storage client at the second network location, wherein the storage request includes a reference to the first storage block.

11. The method of claim 9, wherein receiving the selection of the first storage block comprises:

identifying the first storage block as likely to be accessed based on usage characteristics of a storage client.

12. A method of optimizing data access using a storage block protocol over a wide-area network, the method comprising:

upon forwarding one or more storage requests to a storage device for processing, adding one or more file system objects to an asynchronous processing queue, wherein the one or more file system objects are associated with one or more storage blocks referenced in the one or more storage requests; and asynchronously and in parallel to the one or more storage requests being processed by the storage device, performing at least the following operations on the one or more file system objects stored in the asynchronous processing queue:

identifying a first portion of a first file system object in a file system corresponding with a first storage block based on a first data structure that associates storage blocks with file system objects, wherein when the file system objects are deleted, the file system objects and their associations with the storage blocks are removed from the first data structure based on a second data structure, wherein the first data structure is different the second data structure that is used by the file system to associate storage blocks with file system objects, wherein the first file system object is in the asynchronous processing queue;

selecting a second portion of at least one of a set of file system objects in the file system for prefetching based on at least one heuristic associated with the first file system object, wherein the second portion of at least one of a set of file system objects has not been requested by a storage client, but is likely to be requested in the near future by the storage client;

identifying at least a second storage block corresponding with the second portion of the one of the set of file system objects, wherein the identifying is independent of the proximity of the second storage block with the first storage block in the data storage;

retrieving the second storage block from the data storage connected with a wide area network at a first network location;

communicating via the wide area network the second storage block from the first network location to a storage block cache at a second network location; and storing the second storage block in the storage block cache.

13. The method of claim 12, wherein the one of the set of file system objects is a second file system object different than the first file system object.

14. The method of claim 12, wherein the heuristic is based on a file type associated with the file system object.

15. The method of claim 14, wherein the heuristic identifies that the second portion of the one of the set of file system objects is frequently accessed based on the file type.

16. The method of claim 14, wherein the one of the set of file system objects includes a file system metadata structure specifying an arrangement of the set of file system objects.

17. The method of claim 12, wherein the heuristic identifies that the second portion of the one of the set of file system objects is referenced by the first file system object.

18. The method of claim 17, wherein the first file system object specifies a sequence of accessing the set of file system objects.

19. The method of claim 18, wherein the first file system object is a log file.

20. The method of claim 18, wherein the first file system object is a cache file.

21. The method of claim 17, wherein the first file system object is configured to access the one of the set of file system objects during execution of an application associated with the first file system object.

22. The method of claim 12, wherein receiving the selection of the first storage block comprises:
receiving a storage request from a storage client at the second network location, wherein the storage request includes a reference to the first storage block.

23. The method of claim 12, wherein receiving the selection of the first storage block comprises:
identifying the first storage block as likely to be accessed based on usage characteristics of a storage client.

24. A method of optimizing data access using a storage block protocol over a wide-area network, the method comprising:
upon forwarding one or more storage requests to a storage device for processing, adding one or more file system objects to an asynchronous processing queue, wherein the one or more file system objects are associated with one or more storage blocks referenced in the one or more storage requests; and asynchronously and in parallel to the one or more storage requests being processed by the storage device, performing at least the following operations on the one or more file system objects stored in the asynchronous processing queue:
identifying a first file system object in a file system corresponding with a first storage block based on a first data structure that associates storage blocks with file system objects, wherein when the file system objects are deleted, the file system objects and their associations with the storage blocks are removed from the first data structure based on a second data structure, wherein the first data structure is different from the second data structure that is used by the file system to associate storage blocks with file system objects, wherein the first file system object is in the asynchronous processing queue;

identifying a first prior access time associated with the first file system object;

identifying a second prior access time associated with a second file system object;

determining if the second prior access time is within a time threshold of the first prior access time;

in response to the determination that the second prior access time is within the time threshold of the first prior access time, selecting the portion of the second file system object for prefetching;

identifying at least a second storage block corresponding with the portion of the second file system object, wherein the identifying is independent of the proximity of the second storage block with the first storage block in the data storage;

retrieving the second storage block from the data storage connected with a wide area network at a first network location;

communicating via the wide area network the second storage block from the first network location to a storage block cache at a second network location; and storing the second storage block in the storage block cache.

25. The method of claim 24, wherein the second file system object is associated with a second prior access time, the method comprising:
prior to receiving the selection of the first storage block, associating the first file system object with the second file system based on the first prior access time being within a time threshold of the second prior access time; and
wherein selecting at least the portion of at least the second file system object in the file system for prefetching based on the first prior access time comprises selecting the portion of the second file system object based on the association with the first file system object.

26. The method of claim 24, wherein receiving the selection of the first storage block comprises:
receiving a storage request from a storage client at the second network location, wherein the storage request includes a reference to the first storage block.

* * * * *